(12) United States Patent
Irimajiri et al.

(10) Patent No.: US 7,142,890 B2
(45) Date of Patent: Nov. 28, 2006

(54) INFORMATION PROCESSING DEVICE, ITEM DISPLAY METHOD, PROGRAM STORAGE MEDIUM

(75) Inventors: Mayu Irimajiri, Tokyo (JP); Shinichi Iriya, Kanagawa (JP); Makoto Imamura, Tokyo (JP); Emi Arakawa, Tokyo (JP); Osamu Sakurai, Tokyo (JP); Tetsuya Kohno, Kanagawa (JP); Seiji Muramatsu, Saitama (JP)

(73) Assignee: Sony Corporation, Tokyo (JP)

( * ) Notice: Subject to any disclaimer, the term of this patent is extended or adjusted under 35 U.S.C. 154(b) by 466 days.

(21) Appl. No.: 10/169,429

(22) PCT Filed: Oct. 26, 2001

(86) PCT No.: PCT/JP01/09448

§ 371 (c)(1),
(2), (4) Date: Jun. 26, 2002

(87) PCT Pub. No.: WO02/37808

PCT Pub. Date: May 10, 2002

(65) Prior Publication Data

US 2003/0013493 A1    Jan. 16, 2003

(30) Foreign Application Priority Data

Oct. 31, 2000 (JP) ............................. 2000-337283
Oct. 31, 2000 (JP) ............................. 2000-337284
Oct. 31, 2000 (JP) ............................. 2000-337285

(51) Int. Cl.
*H04B 1/38* (2006.01)
*H04M 1/00* (2006.01)
*H04N 5/445* (2006.01)
*G06T 15/00* (2006.01)
*G06F 15/00* (2006.01)

(52) U.S. Cl. .................. 455/566; 345/419; 348/563; 715/500.1; 715/848; 725/37

(58) Field of Classification Search ............... 455/566; 348/563; 715/500.1, 848; 725/37; 345/419
See application file for complete search history.

(56) References Cited

U.S. PATENT DOCUMENTS

| | | | | |
|---|---|---|---|---|
| 5,469,540 A | * | 11/1995 | Powers et al. | 715/500.1 |
| 5,485,197 A | * | 1/1996 | Hoarty | 725/37 |
| 5,724,492 A | * | 3/1998 | Matthews et al. | 345/419 |
| 5,856,827 A | | 1/1999 | Sudo | |
| 5,995,104 A | * | 11/1999 | Kataoka et al. | 715/848 |
| 6,266,098 B1 | * | 7/2001 | Cove et al. | 348/563 |

FOREIGN PATENT DOCUMENTS

CN    1167390 A    12/1997

(Continued)

*Primary Examiner*—William D. Cumming
(74) *Attorney, Agent, or Firm*—Finnegan, Henderson, Farabow, Garrett & Dunner, L.L.P.

(57) ABSTRACT

A method of three-dimensionally rotating a plurality of menus displayed in an ordered stack on a display unit of a portable telephone. The method displays the plurality of menus three-dimensionally on the display unit according to the ordered stack. The menu displayed in front is a current menu and the remainder of the menus are displayed in order behind the current menu. A menu rotation direction is selected and the plurality of menus are rotated in the menu rotation direction in accordance with the ordered stack. In this manner, the next menu in the ordered stack is rotated in the menu rotation direction to the front and becomes the current menu.

10 Claims, 19 Drawing Sheets

FOREIGN PATENT DOCUMENTS

| | | |
|---|---|---|
| EP | 0 792 056 | 8/1997 |
| JP | 63-296131 | 12/1988 |
| JP | 2-235095 | 9/1990 |
| JP | 7-114451 | 5/1995 |
| JP | 9-16369 | 1/1997 |
| JP | 9-233161 | 9/1997 |
| JP | 10-75402 | 3/1998 |
| JP | 2000-105650 | 4/2000 |
| JP | 2001-308991 | 11/2001 |
| JP | 2000-283782 | 10/2003 |
| KR | 97-64027 | 9/1997 |

* cited by examiner

US 7,142,890 B2

INFORMATION PROCESSING DEVICE, ITEM DISPLAY METHOD, PROGRAM STORAGE MEDIUM

TECHNICAL FIELD

The present invention relates to an information processing device, item display method, and program storage medium and more particularly, is suitably applied to a portable telephone.

BACKGROUND ART

A conventional portable telephone lists many items corresponding to various functions in a line on a display unit which is a liquid crystal display, executes the processing corresponding to a desired item selected and confirmed by a user with an arrow key or the like, and displays the processing result.

In this case, because all items arranged in a line are hard for a user not only to see but also to find out a desired item, the menus are classified according to functions or mode and the portable telephone displays them in the form of menus on the display unit.

By the way, in such a portable telephone that menus are created through classification into modes, the user firstly needs to display on the display unit a menu corresponding a desired mode before selecting an item.

In this case, the user has to confirm the menu whether it is the one which has been selected by himself because the menus created through the classification have all the same format. The portable telephone, however, has the display unit of a limited size and therefore, displays the title letters of each item in a small size, which causes problems in that the user can not judge immediately whether the menu being displayed corresponds to the desired mode and as a result, its operability is no good.

Further, in such a portable telephone, although a selected item enclosed by a frame of a predetermined shape is displayed in order to visually differ from the unselected items, the selected item and unselected items have the same luminance level and the same color tone, which causes a problem in that the selected item and the unselected items are difficult to distinguish at one moment. On the other hand, some portable telephones display an selected item in an inverse video in order to visually differ from the other unselected items, which causes a problem in that the title letters of the selected item may be hard to see due to the color of the inverted display area.

Furthermore, a conventional portable telephone, as shown in FIG. 21(A), displays plural items corresponding to various functions of the portable telephone on a display unit 100 which is a liquid crystal display, executes the processing corresponding to a desired item selected and confirmed by a user, and displays the processing result.

In this case, the portable telephone displays a selection frame (hereinafter, referred to as a cursor) 102 of a given shape so as to enclose one item, on the display unit 100, in order to allow a user to select a desired item by moving the cursor 102 up and down with an arrow key or the like.

By the way, such portable telephone has a limited size of the display unit 100 and therefore, displays only some (5 items, for example) out of the plural items on the display unit 100.

In the case where hidden items (these are referred to as upper undisplayed items 103) exist above the displayed items, the portable telephone displays an upward triangle icon 104 at the top end of the display unit 100 in order to inform a user of the existence of the upper undisplayed items 103.

Similarly, in the case where hidden items (these are referred to as lower undisplayed items 105) exist following the displayed items, the portable telephone displays a downward triangle icon 106 at the bottom end of the display unit 100 in order to inform the user of the existence of the lower undisplayed items 105.

Then, in a situation where the upper undisplayed items 103 exist and the cursor 102 appears at the first end of the display unit 101 as shown in FIG. 21(B), when the cursor 70 is to be moved upward further, the portable telephone moves not the cursor 102 but all items together downward (in a direction opposite to the movement operation) by one item in order to display an item 101B, which has been hidden, in the cursor 102 so that the item 101B is selectable as shown in FIG. 21(C).

Similarly, in a situation where the lower undisplayed items 105 exists and the cursor 102 appears at the bottom end of the display unit 100, when the cursor 70 is to be moved downward further, the portable telephone moves not the cursor 102 but all items together upward (in a direction opposite to the movement operation) by one item in order to display an item 101H, which has been hidden, the cursor 102 so that the item 101H is selectable as shown in FIG. 21(D).

In this way, the portable telephone allows the user to select an item by sequentially display items, which are more than the number of items which can be displayed on the display unit 100 at a time, on the display unit 100.

By the way, such a portable telephone does not display an upper undisplayed item 103 or an lower undisplayed item 105 which is selectable next by operating the cursor 102, on the display unit 100 when the cursor 102 appears at the top end or the bottom end of the display unit 100, which causes a bad-operability problem because the user can not know which item is selectable next.

In addition, when the cursor 102 being displayed at the top end of the display unit 100 is to be moved upward or the cursor 102 being displayed at the bottom end of the display unit 100 is to be moved downward, such portable telephone moves all items in a direction opposite to the movement operation. It means that the direction of the inputted operation and the movement direction of the screen display are not the same, and the cursor 102 itself does not move, which causes a bad-operability problem in that it is hard for the user to recognize whether his movement operation has been surely entered.

DESCRIPTION OF THE INVENTION

The present invention is made in view of above points and intends to propose an information processing device, an item display method and a program storage medium, which realizes the display of items easy to see, with high usability and operability.

To solve such problems, in this invention, an arbitrary item selected in response to on the operation of a predetermined operating means from a menu comprising a plurality of items being displayed on a display unit by a menu display means is recognized, the selected item recognized is displayed at the highest luminance level and the non-selected items, which have not been recognized, are displayed at luminance levels which are gradually decreased as they get farther from the selected item, so that the selected item is easy to see because of its brightness and as a result, the user naturally focuses on the selected item and thus, the selected item can get much easier to see.

Further, in this invention, when plural kinds of menus is to be displayed on the display unit, each menu is displayed in a different color according to its kind, so that the user can easily recognize the kind of menu from its color by intuition.

Furthermore, in this invention, at least some of plural items are listed and displayed in the display area of the display unit, an indicator for selecting one out of the items being displayed in the display area is displayed in the display area, and when a new item is selected by moving the indicator in response to the movement operation of operating means, the indicator and all items are shifted altogether by one item in a direction opposite to the movement direction of the indicator, so that the direction of the movement operation and the movement direction of the indicator are always the same and an item which is selectable next is always displayed on the display unit, which offers improved usability and prevents erroneous operations.

BEST MODE FOR CARRYING OUT THE INVENTION

One embodiment of the present invention will be described in detail with reference to the accompanying drawings.

(1) Construction of Camera-integrated Portable Telephone

Figure 1:
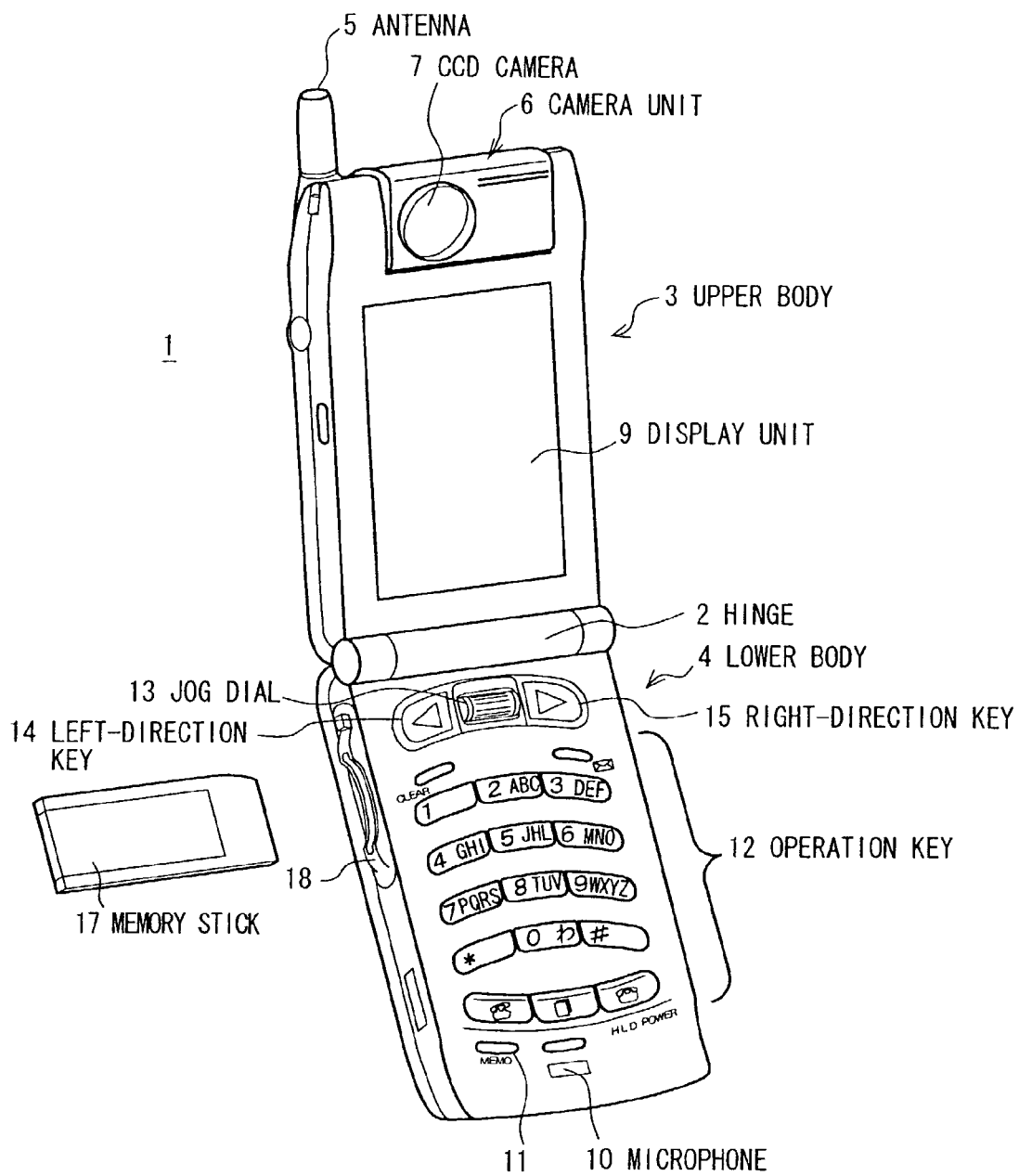
FIG. 1 is a schematic diagram showing the external construction of a camera-integrated digital portable telephone in one embodiment of this invention.

Referring to FIG. 1, reference numeral 1 shows, as a whole, a camera-integrated portable telephone (hereinafter, referred to as a portable telephone) as an information processing device of this invention and is divided into an upper body 3 and a lower body 4 with a central hinge 2 as a border and thereby, it is foldable at the hinge 2.

The upper body 3 has a telescopic antenna 5 for transmission and reception at the top on the left, and a camera unit 6 which can be rotated within approximately 180 degrees, at the center top so as to take a picture of a desired subject with a CCD (Charge Coupled Device) camera 7 of the camera unit 6.

Figure 2:
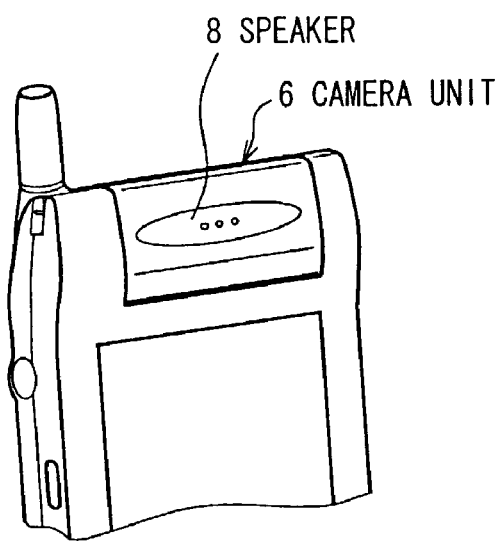
FIG. 2 is a schematic diagram showing an upper body with a camera unit rotated.

When a user rotates the camera unit 6 by approximately 180 degrees, a speaker 8 provided in the center on the back of the camera unit 6 faces to the front as shown in FIG. 2 and thereby, the mode is switched to a normal voice communication mode.

In addition, the upper body 3 has the display unit 9 which is a color liquid crystal display with 256 colors on the front thereof, so that the display unit 9 can display various information including menus corresponding to various functions, reception quality of radio waves, battery level, history of outgoing calls, history of incoming calls, electronic mails, simple homepages, pictures taken with the CCD camera 7 of the camera unit 6.

On the other hand, the lower body 4 has a microphone 10 and a memo button 11 at the bottom on the front surface thereof, so that the microphone 10 can collect user voice during conversation and record voice of the communication mate in response to pressing the memo button 11.

In addition, the lower body 4 has a plurality of operation keys 12 comprising numeral keys from 0 to 9, a call key, a redial key, an end/power key, a clear key and an e-mail key, in the center on the front surface, rotation/press operating means (jog dial) 13 which can be rotated and pressed, above the operation keys 12, a left-direction key 14 and a right-direction key 15 for instructing left and right movements, on the both sides of the jog dial 13, as an operation inputting section 16, so as to perform various processing such as a menu/item selection, calling, writing of an e-mail, and data communication, in response to operations of the operation inputting section 16.

For example, the portable telephone 1 selects a telephone number desired by a user from a directory list being displayed on the display unit 9, in accordance with the rotation operation of the jog dial 13, and confirms the selected telephone number in response to pressing the jog dial 13 and thereby, it automatically call on the telephone number.

Figure 3:
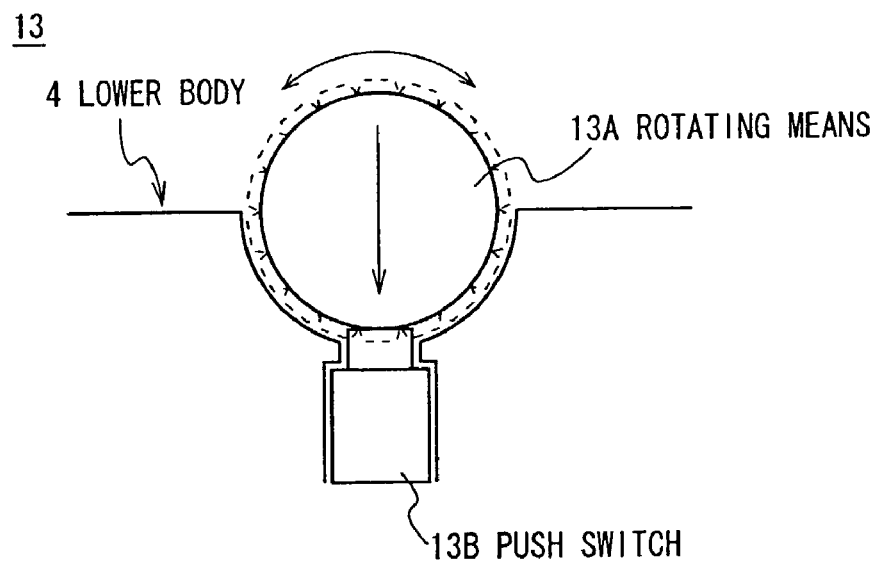
FIG. 3 is a schematic cross sectional view showing the cross sectional construction of a jog dial.

The jog dial 13 is attached with a cylindrical rotating means 13A slightly projecting from the front surface of the lower body 4 as shown in FIG. 3 so that, for example, the user can easily rotate the rotating means 13A with his thumb.

This jog dial 13 generates a pulse signal according to the rotation operation via a built-in rotary encoder every time when the rotating means 13A is rotated, in order to notice internal circuits of how much the rotating means 13A has been rotated, and then when the rotating means 13A is pressed, it notices the internal circuits via a push switch 13B that an item has been confirmed.

It should be noted that the lower body 4 has a battery pack, not shown, contained on the back side thereof, and each circuit block is supplied with power from the battery pack when power is turned on in response to operating the operation key 12, in order to be active.

In addition, the lower body 4 has a memory stick slot 18 for accepting a removable memory stick (trademark of Sony Corporation) 17 at the top on the left side thereof, in order to record voice of a communicating mate in the memory stick 17 in response to pressing the memo button 11, and to record e-mails, simple homepages, pictures taken with the CCD camera 7 and also to take out recorded various data in accordance with the operations of the operation inputting section 16.

This memory stick 17 is a kind of flash memory card which has been developed by assignee of this application, Sony corporation, and has a flash memory element made by containing EEPROM (Electricity Erasable and Programmable Read Only Memory) which is a electrically rewritable and erasable non-volatile memory, in a small thin plastic case, so that various data including picture, voice, music can be stored in and read out the memory stick via a ten-pin terminal.

Further, as to the change in the specification of the built-in flash memory element, such as capacity increase, the memory stick 17 adopts a special serial protocol which has compatibility with other devices, and offers high performance with the maximum recording rate of 1.5 [MB/s], the maximum reading rate of 2.45 [MB/s] and high reliability with a switch for preventing an erroneous delete.

As a result, since the portable telephone 1 can be used with the removable memory stick 17 inserted therein, data can be shared with other electric devices via the memory stick 17.

(2) Circuit Structure of Camera-integrated Digital Portable Telephone

Figure 4:
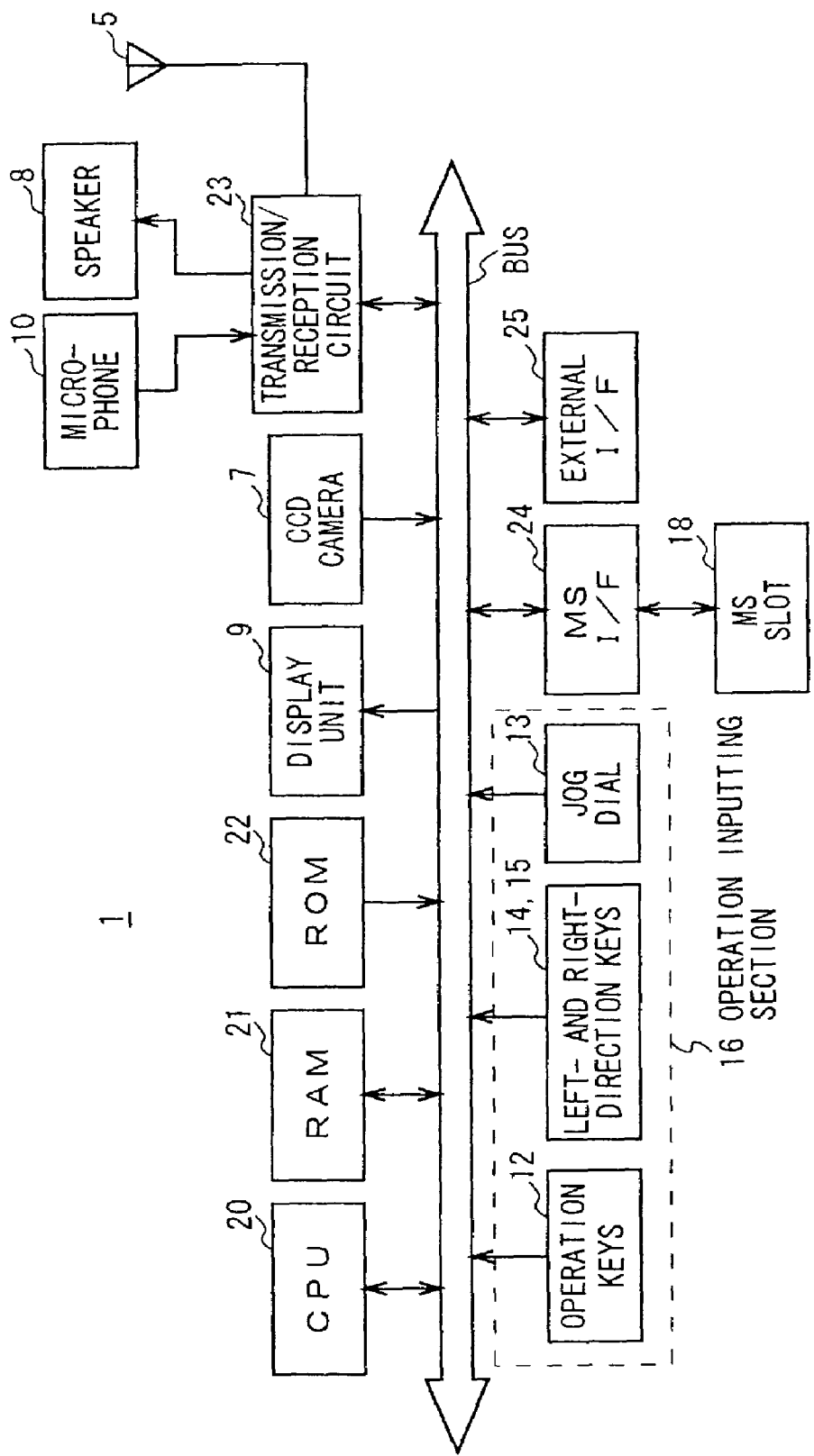
FIG. 4 is a block diagram showing the circuitry of the camera-integrated digital portable telephone.

Next, the circuit structure of the portable telephone 1 will be explained with reference to FIG. 4. This portable telephone 1 has such a structure that a CPU (Central Processing Unit) 20 for entirely controlling the various functions of the portable telephone 1 is connected by a bus BUS with a RAM (Random Access Memory) 21, a ROM (Read Only Memory) 22, the display unit 9, the CCD camera 7, a transmission/reception circuit 23, the operation inputting section 16 composed of the operation keys 12, the jog dial 13 and the left- and right-direction keys 14, 15, a memory stick interface 24 for transmitting/receiving data with the memory stick 17 inserted into the memory stick slot 18 through the bus BUS, and an external interface 25 for performing data communications with an external device such as a personal computer and PDA (Personal Data Assistant), and the transmission/reception circuit 23 is connected with the microphone 10, the speaker 8 and the antenna 5.

In addition, the portable telephone 1 has the basic program and various application programs stored in the ROM 22, so that the CPU 20 reads these various programs and executes them in the RAM 21 in order to realize various functions.

For example, the CPU 20 controls the transmission/reception circuit 23 based on information on the operations of the operation inputting section 16 in accordance with the basic program, in order to perform various communication processing such as calling, call-ending processing.

That is, the transmission/reception circuit 23 makes a call by transmitting a predetermined control signal to a base station (not shown) via the antenna 5 under the control of the CPU 20, and also receives an incoming-call signal from the base station via the antenna 5 and then makes an incoming-call notice to the CPU 20.

Then, during conversation, the transmission/reception circuit 23 generates an audio signal by amplifying and then demodulating the reception signal received via the antenna 5 and then outputs it to the speaker 8, and also generates a transmission signal by modulating and then amplifying the audio signal inputted from the microphone 10 and then transmits it via the antenna 5.

In addition, the CPU 20 performs capture processing by controlling the CCD camera 7 based on information on operations of the operation inputting section 16 in accordance with a video processing program. The CPU 20 stores video data taken with the CCD camera 7 into the RAM 21 once, so as to display the video data on the display unit 9, store it into the memory stick 17, and transmit it via the transmission/reception circuit 23, as required.

(3) Menu Display Processing

Figure 5:
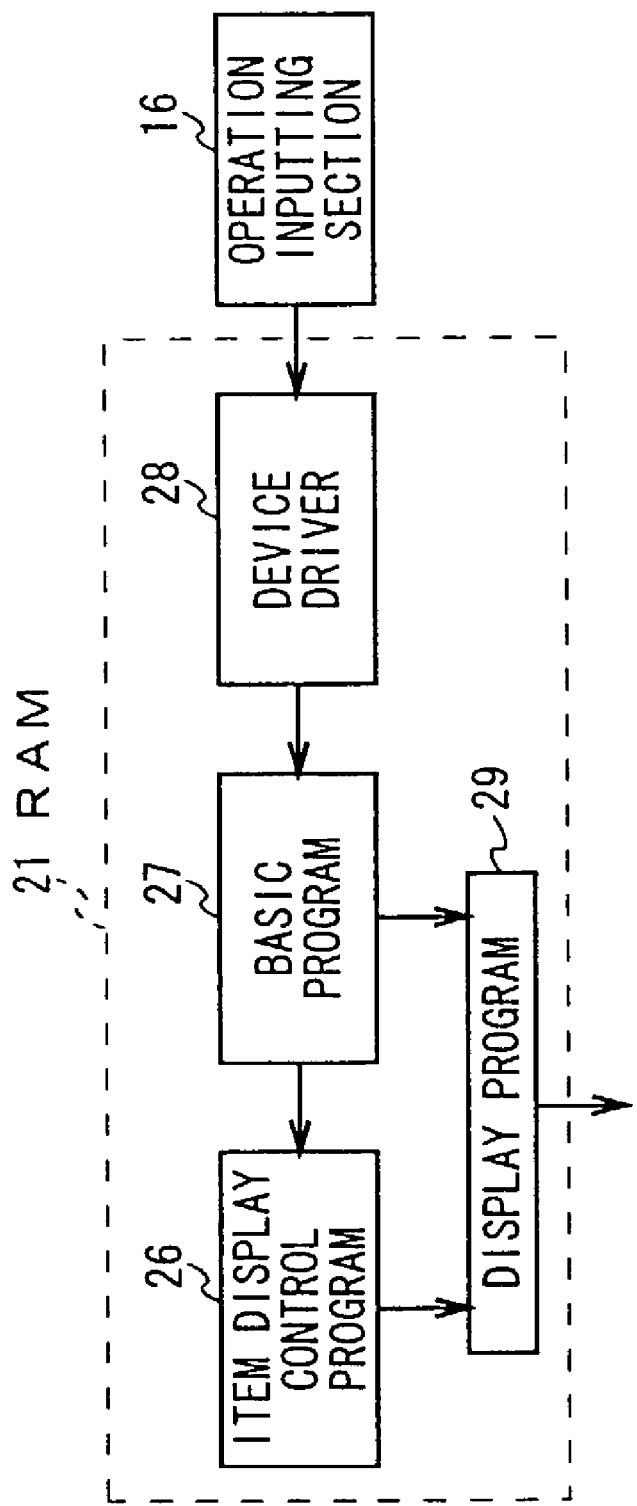
FIG. 5 is a schematic diagram showing the relationship between a basic program and application programs.

In the portable telephone 1, the basic program 27, the device driver 28, the display program 29, and the menu display control program 26 are taken out from the ROM 22 and put in the RAM 21 as shown in FIG. 5, in order to execute the menu display processing on the display unit 9 in response to the operations of, for example, the left-direction key 14, right-direction key 15 and jog dial 13 of the operation inputting section 16 in accordance with mainly the menu display control program 26.

That is, in the portable telephone 1, when the left-direction key 14 or the right-direction key 15 is pressed or the jog dial 13 is rotated or pressed, for example, an input signal corresponding to the operation of the left-direction key 14, right-direction key 15 or jog dial 13 is given from the device driver 28 to the menu display control program 26 via the basic program 27, and thereby performing the menu display processing on the display unit 9 in accordance with the menu display control program 26 and the display program 29.

Figure 6:
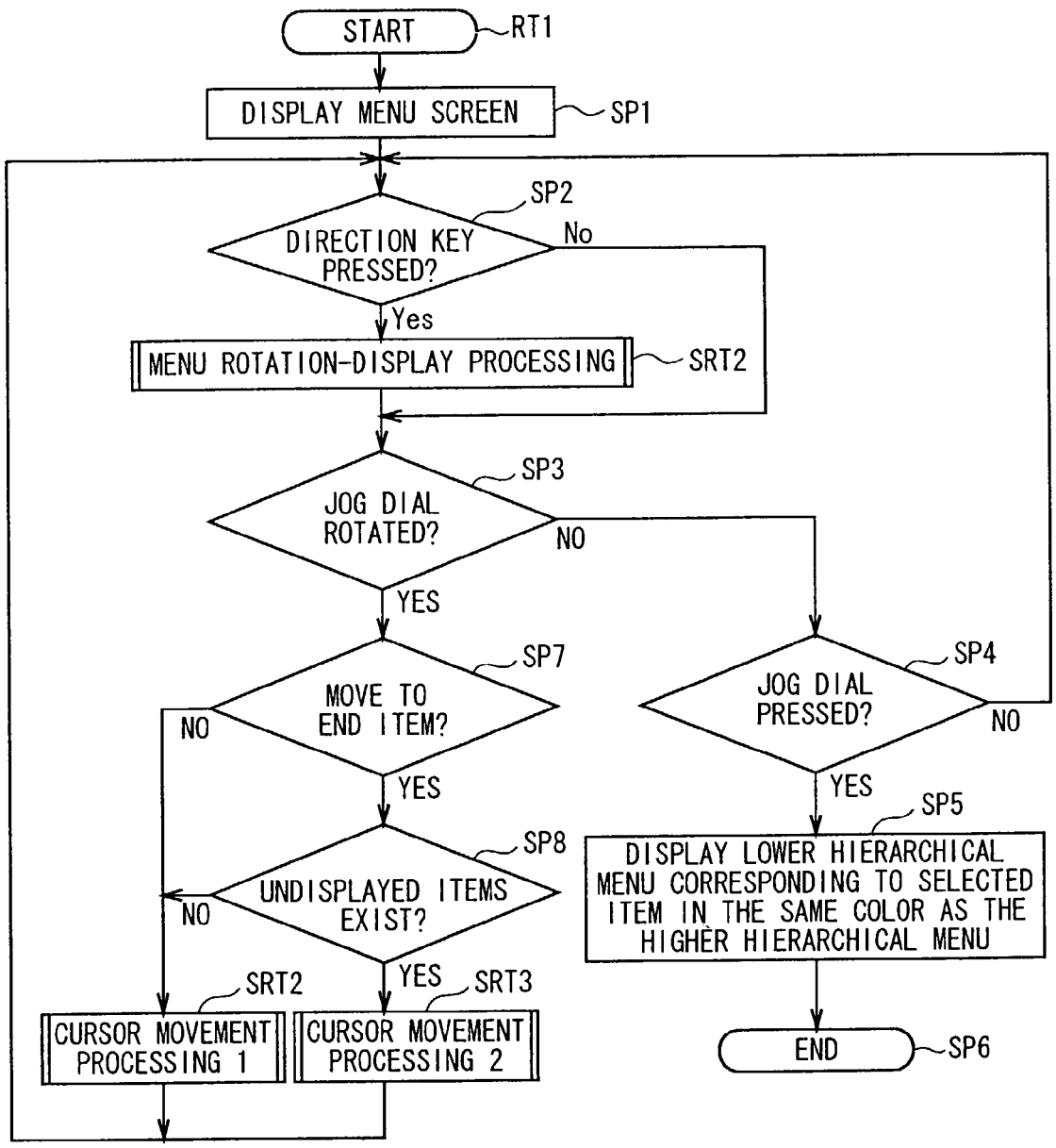
FIG. 6 is a flowchart showing a menu-and-item selection processing procedure.
Figure 7:
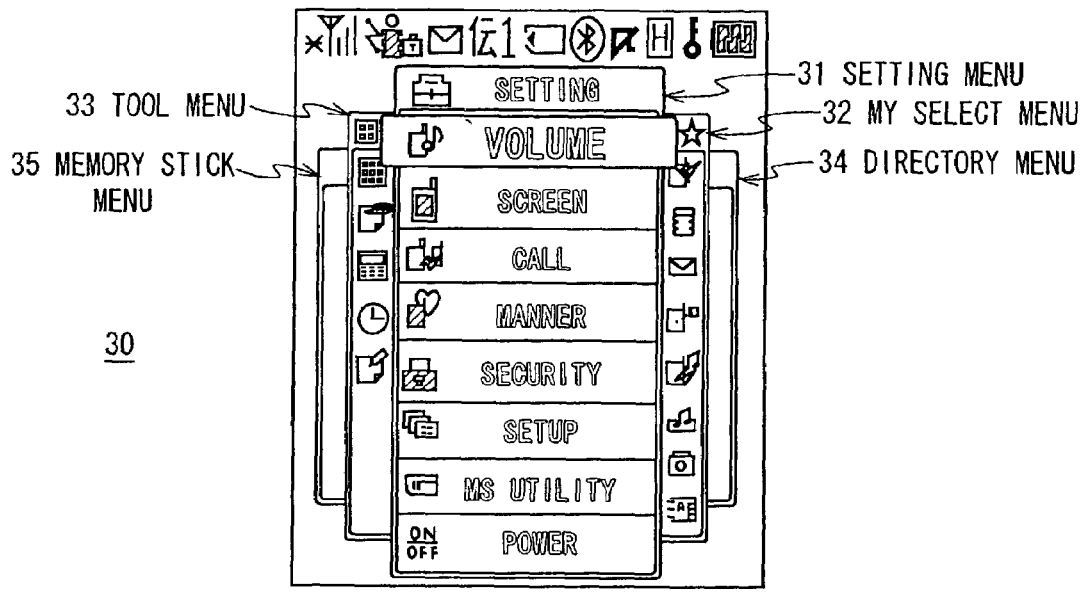
FIG. 7 is an illustration showing a menu screen.

When the portable telephone 1 is turned ON, it starts a routine RT1 shown in FIG. 6 at start step and moves to step SP1. At step SP1, the CPU 20 of the portable telephone 1 displays an initial menu screen 30 on the display unit 9 as shown in FIG. 7 and moves to next step SP2.

Specifically, the CPU 20 displays a plurality of icons indicating a reception quality of radio waves, an electronic mail, a message memo, key lock and a battery level at the top end of the menu screen 30 and a setting menu 31 corresponding a setting mode in the center of the screen.

In addition, the CPU 20 arranges my select menu 32, tool menu 33, directory menu 34 and memory stick menu 35 behind the setting menu 31 so as to see only parts of these menus from both sides of setting menu 31, which offers a visual three-dimensional display as if the four kinds of menus 32 to 35 exist behind the setting menu 31. That is, it has such visual effect that users can see the menu screen 30 three-dimensionally.

It should be noted that the CPU 20 gradually decreases the luminance levels of the four kinds of menus 32–35 arranged behind the setting menu 31, to about half of that of setting menu 31 at maximum, and as a result, the existence of the four kinds of menus 32 to 35 displayed behind the setting menu 31 is tacitly displayed while the setting menu 31 in front is remarkably displayed.

Figure 8:
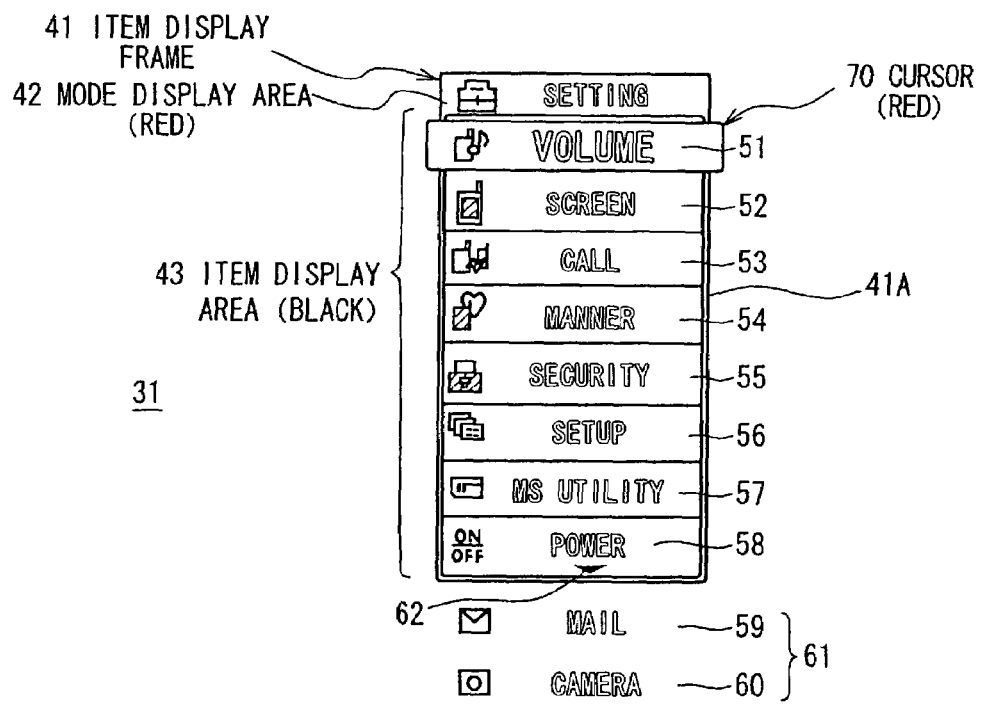
FIG. 8 is an illustration showing a setting menu.

As shown in FIG. 8, an item display frame 41 of the setting menu 31 has a mode display area 42 for displaying the title letters "setting" which indicates a setting mode at the top in the item display frame 41, and an item display area 43 for displaying eight kinds of items which can be set in this setting mode: "volume" item 51; "screen" item 52; "call" item 53; "manner" item 54; "security" item 55; "setup" item 56; "MS utility" item 57; and "power" item 58, in a line as an initial display.

It should be noted that "mail" item 59 and "camera" item 60 are not displayed and they are hidden below the item display area 43 in the initial display (these items which are hidden below are referred to as lower undisplayed items 61), and a downward triangle icon 62 is displayed at the bottom end of the item displayed area 43 to notice a user of the existence of the lower undisplayed items 61.

Similarly, when items which are hidden above the item display area 43 (these items are referred to as upper undisplayed items 63) exist (FIG. 17(C)), an upward triangle icon 64 is displayed at the top of the item display area 43 to notice a user of the existence of the upper undisplayed items 63.

In this embodiment, in the case of displaying the setting menu 31 in front on the menu screen 30, the CPU 20 can make the user recognize that "volume" item 51 is currently selected, by displaying "volume" item 51 arranged on the first line of the item display area 43 with a slightly bigger rectangular indicator (hereinafter, referred to as a cursor) 70 enclosing "volume" item 51 and also with the title letters of "volume" item 51 displayed in a larger size than those of the other unselected items.

In this case, the CPU 20 displays the title letters of "volume" item 51 being selected with the cursor 70 in 16 point while displaying the title letters of the unselected items in 14 point, so that the title letters of "volume" item 51 can become remarkable.

In addition, the CPU 20 colors the frame 41A and the mode display area 42 composing the item display frame 41 in, for example, red, colors the area of each item in the item display area 43 (background against the title letters of each item 51–58) in, for example, black, and colors the title letters in white which contrasts vividly with the colors of the mode display area 42 and the item display area 43.

Then, in the case where "volume" item 51 is selected with the cursor 70, the CPU 20 changes the area color of the cursor 7b from black, which is the color in the item display area 43, to red, so that this red can make the user recognize immediately that "volume" item 51 is currently selected with the cursor 70.

Further, the CPU 20 colors the area inside the cursor 70 in red which contrasts vividly with black which is the area color of the item display area 43, so that the cursor 70 itself can become more remarkable.

In addition, the CPU 20 displays the title letters of "volume" item 51 being selected with the cursor 70 at the highest luminance level (100[%]), so that the white title letters can contrast more vividly with the color (red) of the cursor 70, which can make the user easily recognize that "volume" item 51 is currently selected with the cursor 70 and also which can significantly improve the visual recognition of the title letters of "volume" item 51.

Specifically, the luminance level for the title letters of "volume" item 51 being selected by the cursor 70 is taken to as 100[%], the CPU 20 displays the title letters of "screen" item 52 arranged below, the title letters of "call" item 53 arranged further below, and the title letters of "manner" item 54 to "power" item 58 arranged further below at the decreased luminance levels of 90[%], 70[%] and 50[%], respectively, and also strengthens the color tones of their title letters so as to gradually get closer to red which is a color of the item display frame 41.

Figure 9:
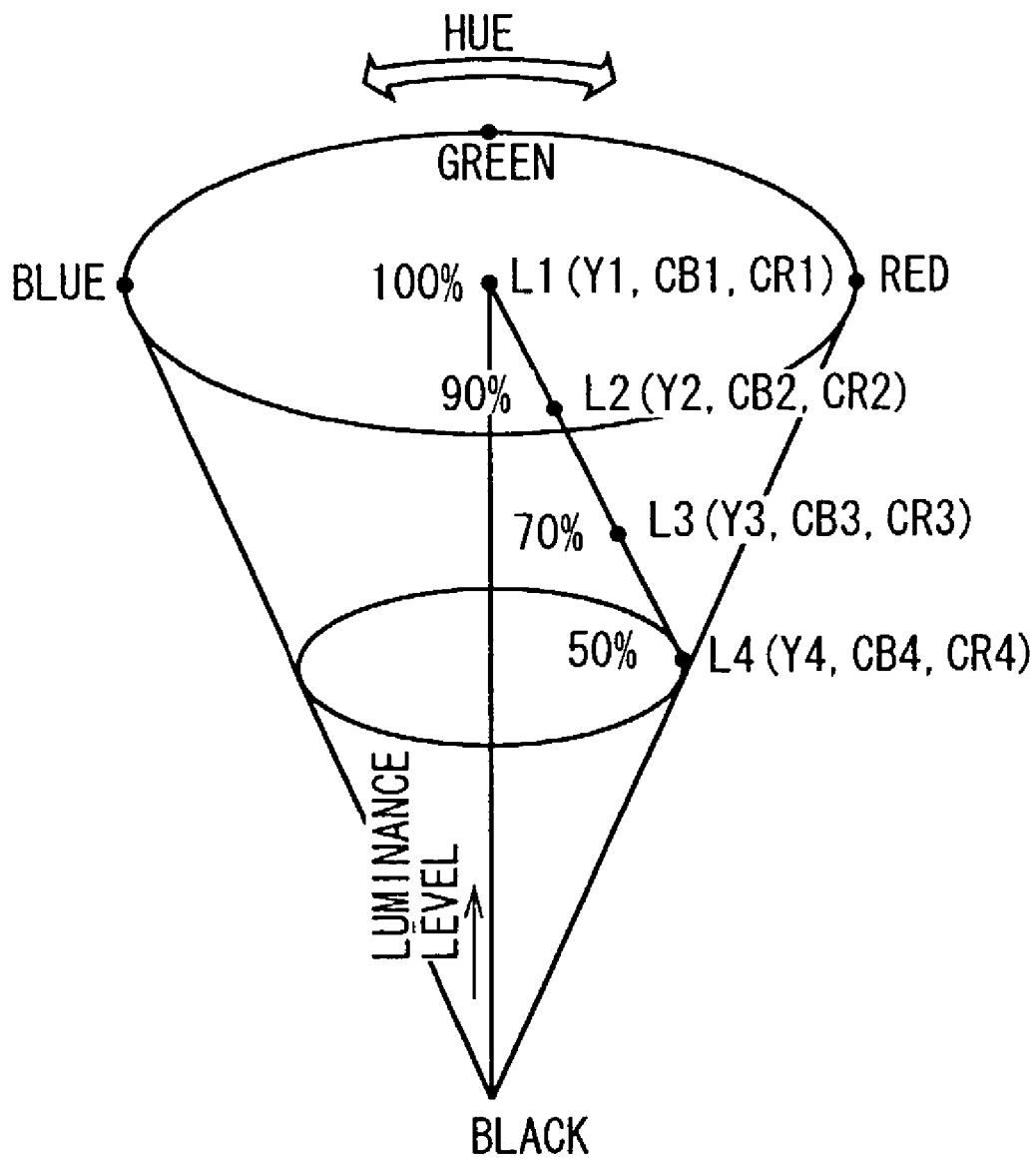
FIG. 9 is an illustration showing a color solid.

Referring to a spatial coordinate which is represented in the form of a color solid as shown in FIG. 9, the CPU 20 controls the display of the title letters of the items in such a way that the coordinate values of the title letters in the spatial coordinate are changed to L1(Y1, CB1, CR1), L2(Y2, CB2, CR2), L3(Y3, CB3, CR3), L4(Y4, CB4, CR4) as the items get farther from "volume" item 51 being selected by the cursor 70, and thereby the luminance levels of the title letters can be gradually decreased to 90[%], 70[%] and 50[%] and the color tones of the title letters can be strengthened to get closer to red.

Thus, as to "volume" item 51 being selected by the cursor 70, the CPU 20 can significantly enhance the contrast of its title letters with the color (red) of the cursor 70, so as to clearly display their outline and to make it much easier to recognize the selected item as compared with the other unselected items and as a result, the user's attention is drawn to "volume" item 51 being selected by the cursor 70.

Then, when the jog dial 13 is rotated while the menu screen 30 is displayed on the display unit 9, the CPU 20 moves the cursor 70 upward or downward to select a next item in accordance with the cursor movement processing procedure which will be described later.

In the jog dial 13, rotating operation causes a light catch (hereinafter, referred to as a rotation click) every predetermined rotation degrees and thereby, the rotation clicks make the user feel how much he has rotated the jog dial 13.

When the jog dial 13 is rotated by one rotation click, the CPU 20 moves and displays the cursor 70 by one item in the rotation operation direction.

In this case, since the CPU 20 moves and displays the cursor 70 1/3 step at a time between items, the cursor 70 looks to move smoothly, which offers a visual effect to users as if the cursor 70 slides.

In addition to the setting menu 31 colored in red on the menu screen 30 (FIG. 7), the CPU 20 colors my select menu 32 in blue, tool menu 33 in orange, directory menu 34 in yellow, memory stick menu 35 in green, which can make the user immediately recognize the kinds of menus from the colors of the menus 31–35.

At step SP2, the CPU 20 judges whether the left-direction key 14 or right-direction key 15 has been pressed on the menu screen having setting menu 31 arranged in front. When a negative result is obtained, this means that any of the left-direction key 14 and right-direction key 15 has not been pressed, and then the CPU 20 moves to step SP3.

On the contrary, when an affirmative result is obtained at step SP2, this means that one of the left-direction key 14 and right-direction key 15 has been pressed, and then the CPU 20 moves to next subroutine SRT2.

Figure 10:
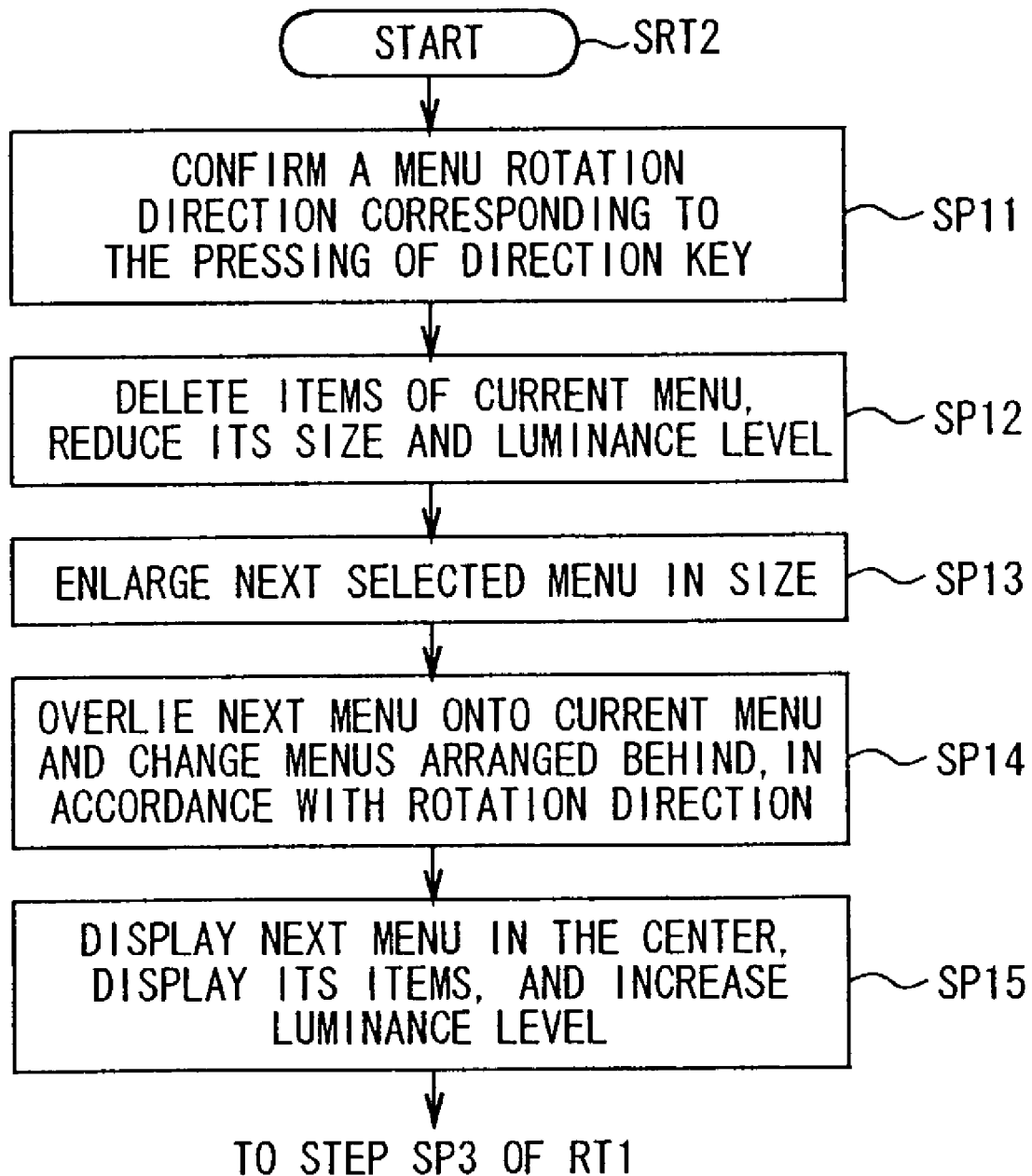
FIG. 10 is a flowchart showing a menu-rotation display processing procedure.

As shown in FIG. 10, the CPU 20 starts the menu rotation display processing procedure at start step of the subroutine SRT2, and moves to next step SP11.

At step SP11, the CPU 20 judges the menu rotation direction corresponding to the pressing operation of the left-direction key 14 or right-direction key 15, and then moves to next step SP12. In this case of pressing the right-direction key 15, for example, the CPU 20 determines such menu rotation direction as to display tool menu 33 in front following setting menu 31 (FIG. 7), and in the case of pressing the left-direction key 14, on the other hand, the CPU 20 determines such menu rotation direction as to display my select menu 32 in front following setting menu 31.

In this connection, in the portable telephone 1, the user can change the setting of the portable telephone 1 according to his favorites so that, for example, pressing the right-direction key 15 is for a menu rotation direction to display my select menu 32 in front following setting menu 31 and pressing the left-direction key 14 is for a menu rotation direction to display tool menu 33 in front following setting menu 31.

Figure 11:
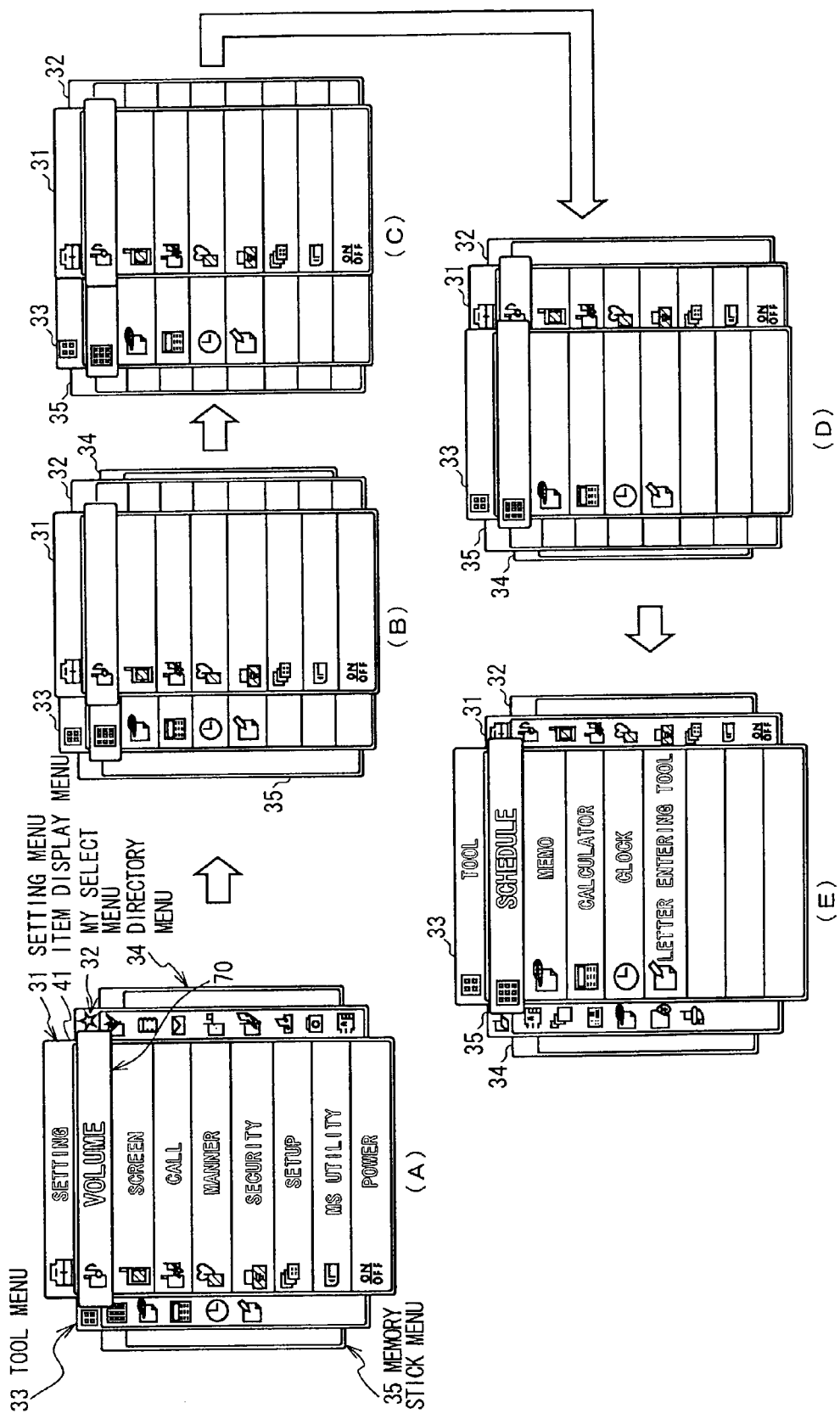
FIG. 11 is illustrations showing an example of a menu-rotation display.
Figure 12:
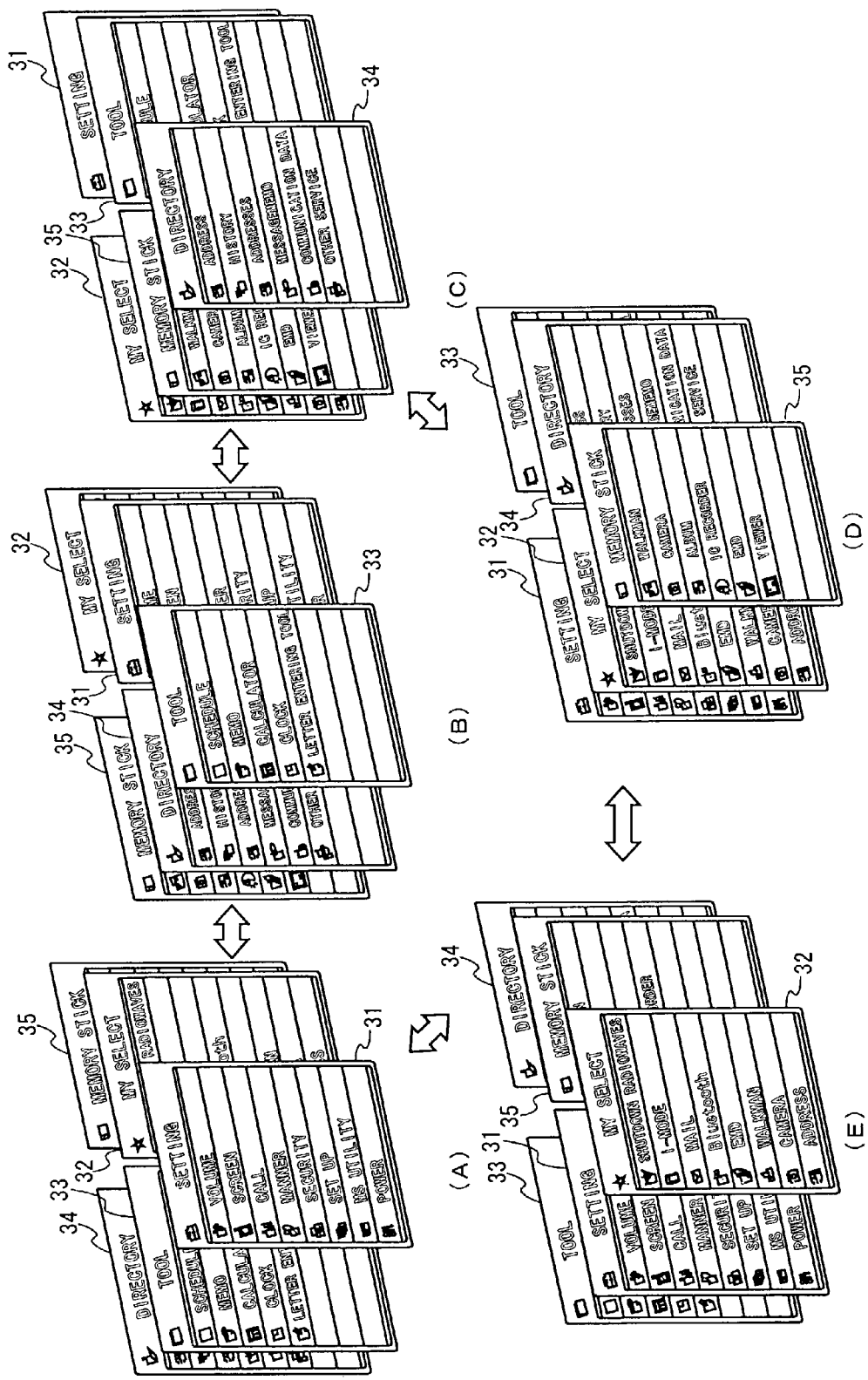
FIG. 12 is illustrations explaining the display order of the menu rotation.

When the CPU 20 determines the menu rotation direction corresponding to the pressing of the right-direction key 15, for example, at step SP12, it deletes the items of setting menu 31, reduces the size in the horizontal direction of the item display frame 41 and decreases the luminance level of setting menu 31 to 50[%] of that in an initial display, as shown in FIG. 11(B), from such the initial display that setting menu 31 is displayed in front as shown in FIG. 11(A), and moves to next step SP13. In this case, the CPU 20 slightly rotates and displays setting menu 31 and the other menus 32–35 arranged behind.

At step SP13, the CPU 20 starts to enlarge the size in the horizontal direction of tool menu 33 which is to be displayed in front next as shown in FIG. 11(C), and moves to next step SP14.

In this point, the CPU 20 further rotates my select menu 32, directory menu 34, memory stick menu 35 in addition to setting menu 31, and tool menu 33, as compared with the display at step SP12, so that directory menu 34 is totally hidden and is not displayed in this time.

At step SP14, the CPU 20 overlies tool menu 33 onto setting menu 31 and displays the side of directory menu 34, which was hidden at the time of step SP13, behind memory stick menu 35 as shown in FIG. 11(D) by continuing to rotate the menus 31–35, and then moves to next step SP15.

At step SP15, the CPU 20 displays next tool menu 30 in the center and enlarges its size in the horizontal direction to be full and then display various items corresponding to tool menu 33 at the luminance levels for the initial display as shown in FIG. 11(E), and then moves to step SP3 of routine RT1.

As described above, the CPU 20 rotates and displays the various menus 31–35 in a menu rotation direction corresponding to pressing of the left-direction key 14 or the right-direction key 15, and that is, as shown in FIGS. 12(A)–(E), the CPU 20 can sequentially rotate and display the menus 31–35 in a circular manner in both of right and left directions in accordance with pressing of the left-direction key 14 and right-direction key 15 from a display having setting menu 31 arranged in front, for example.

Therefore, the CPU 20 sequentially rotate and display the menus 31–35 while the right-direction key 15, for example, continues to be pressed, so that even a user desired menu passes the front position, the user can continue to press the right-direction key 15 for another one circle, without pressing the left-direction key 14, which allows the user to select a selection process.

At step SP3, the CPU 20 judges in a situation where the menu screen 30, for example, is positioned in front in response to pressing of the left-direction key 14 and right-direction key 15 as described above, whether the user has rotated the jog dial 13.

When a negative result is obtained at step SP3, which means that the jog dial 13 has not been rotated and then, the CPU 20 moves to step SP4.

At step SP4, the CPU 20 judges in a situation where "volume" item 51, for example, is selected by the cursor 70, whether the jog dial 13 has been pressed. When a negative result is obtained at step SP4, which mean that the jog dial 13 has not been pressed and then, the CPU 20 repeats the processing of step SP2 and following steps.

On the other hand, when an affirmative result is obtained at step SP4, which means that "volume" item 51 being selected has been confirmed by pressing the jog dial 13 and then, the CPU 20 moves to next step SP5.

Figure 13:
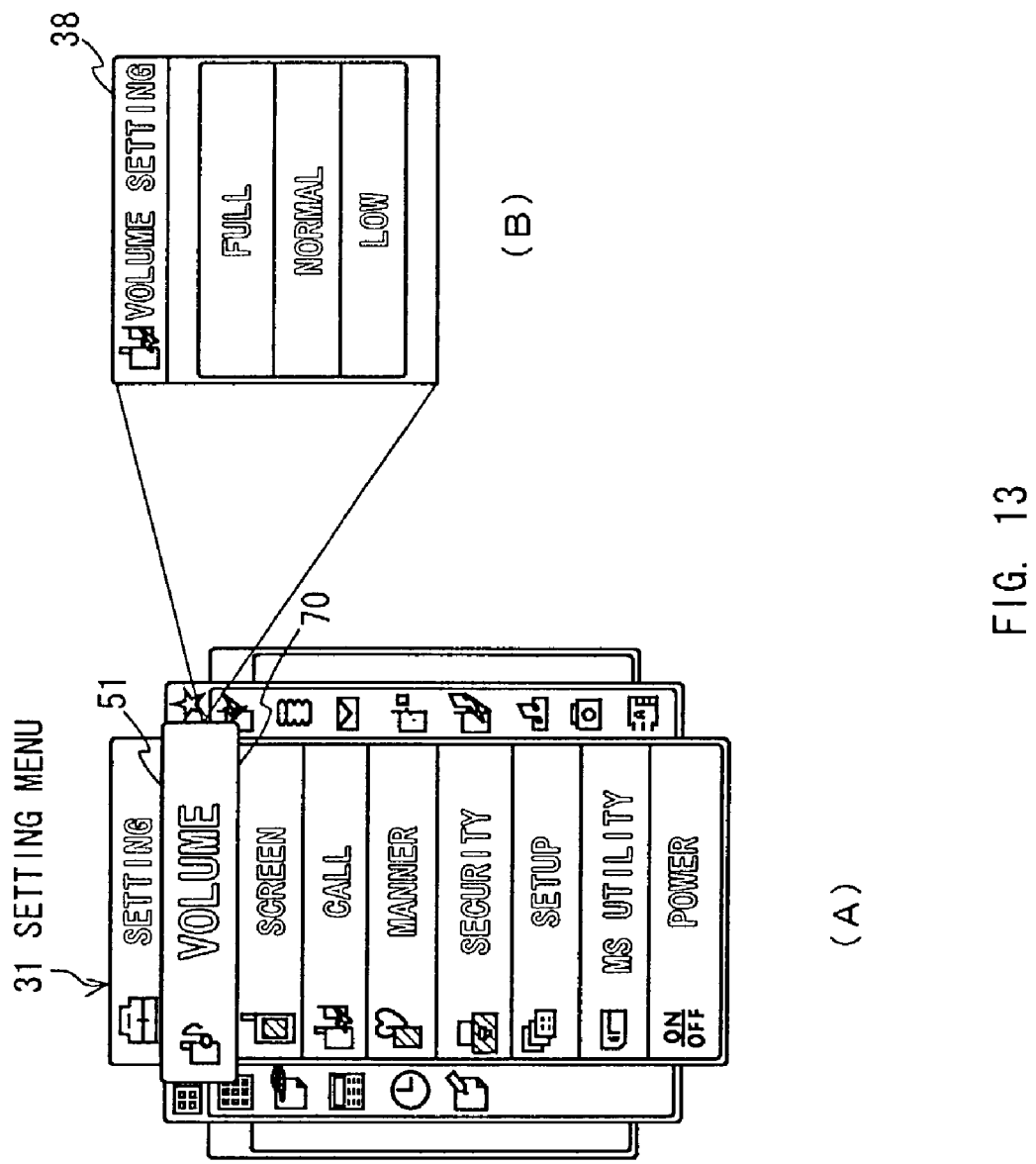
FIG. 13 is illustrations explaining a display of a lower-hierarchical menu.

At step SP5, the CPU 20 displays a volume setting screen 38 in the lower hierarchical layer of "volume" item 51 confirmed, in place of setting menu 31, as shown in FIGS. 13(A) and (B) and then, moves to next step SP6 to terminate the menu item selection processing procedure.

At this time, the CPU 20 colors the area of the volume setting screen 38 in red which is the same color as the setting menu of the higher hierarchical layer, so that the user who is setting volume on the volume setting screen 38 can recognize that he is doing setting on the screen which is in the lower hierarchical layer of the setting menu 31 in the setting mode.

On the other hand, when an affirmative result is obtained at step SP3, which means that the jog dial 13 has been rotated and in this case, the CPU 20 moves to step SP7.

The CPU 20 judges at step SP7 whether the rotation of the jog dial 13 causes the cursor 70 to move to an end item in the item display area 43.

When a negative result is obtained at step SP7, which means that the rotation does not cause the cursor 70 to move an end item in the item display area 43 and in this case, the CPU 20 executes the cursor movement processing 1 of the subroutine SRT2.

Figure 14:
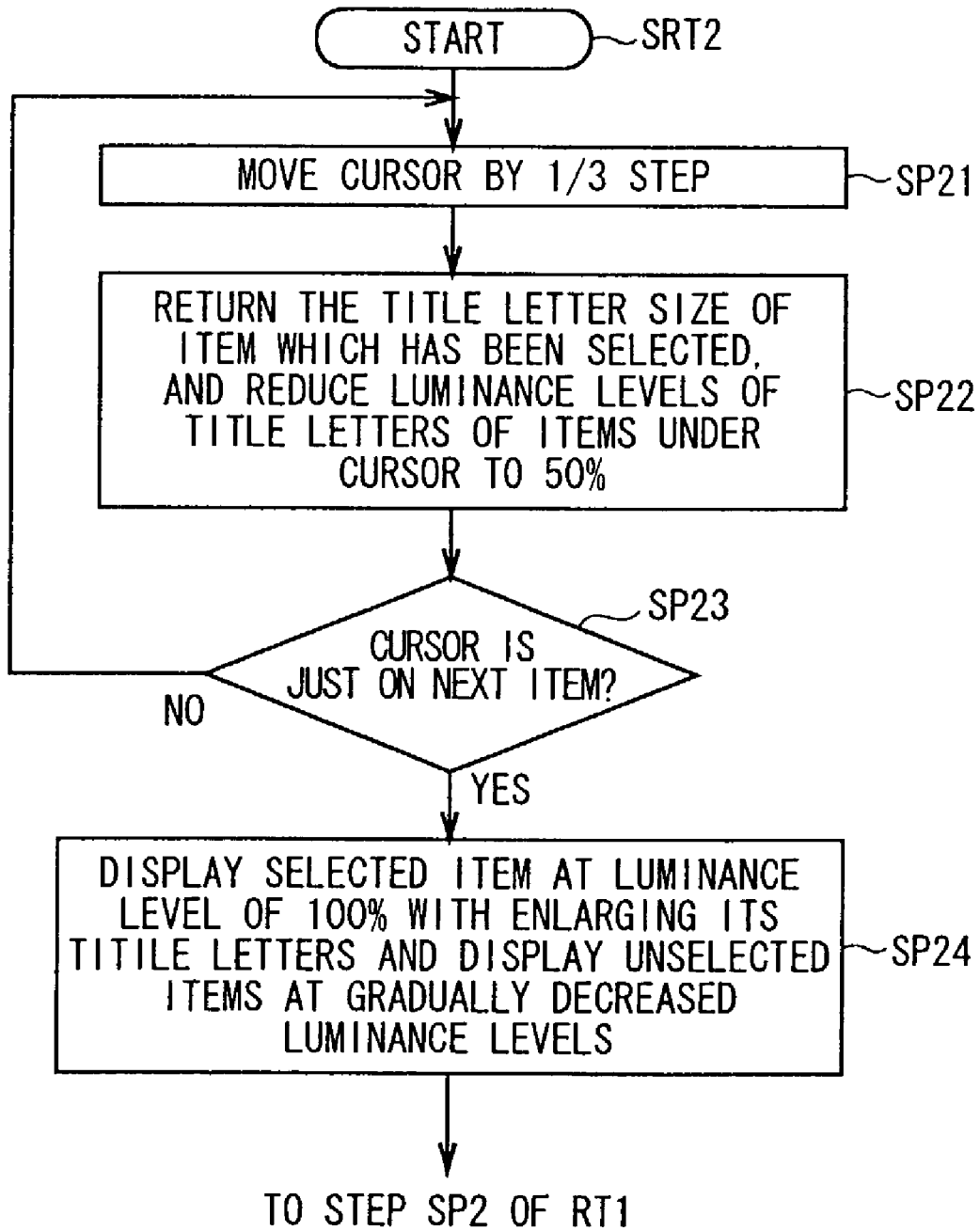
FIG. 14 is a flowchart showing a cursor movement processing procedure.

As shown in FIG. 14, the CPU 20 starts the subroutine SRT2 at start step and moves to next step SP21.

Figure 15:
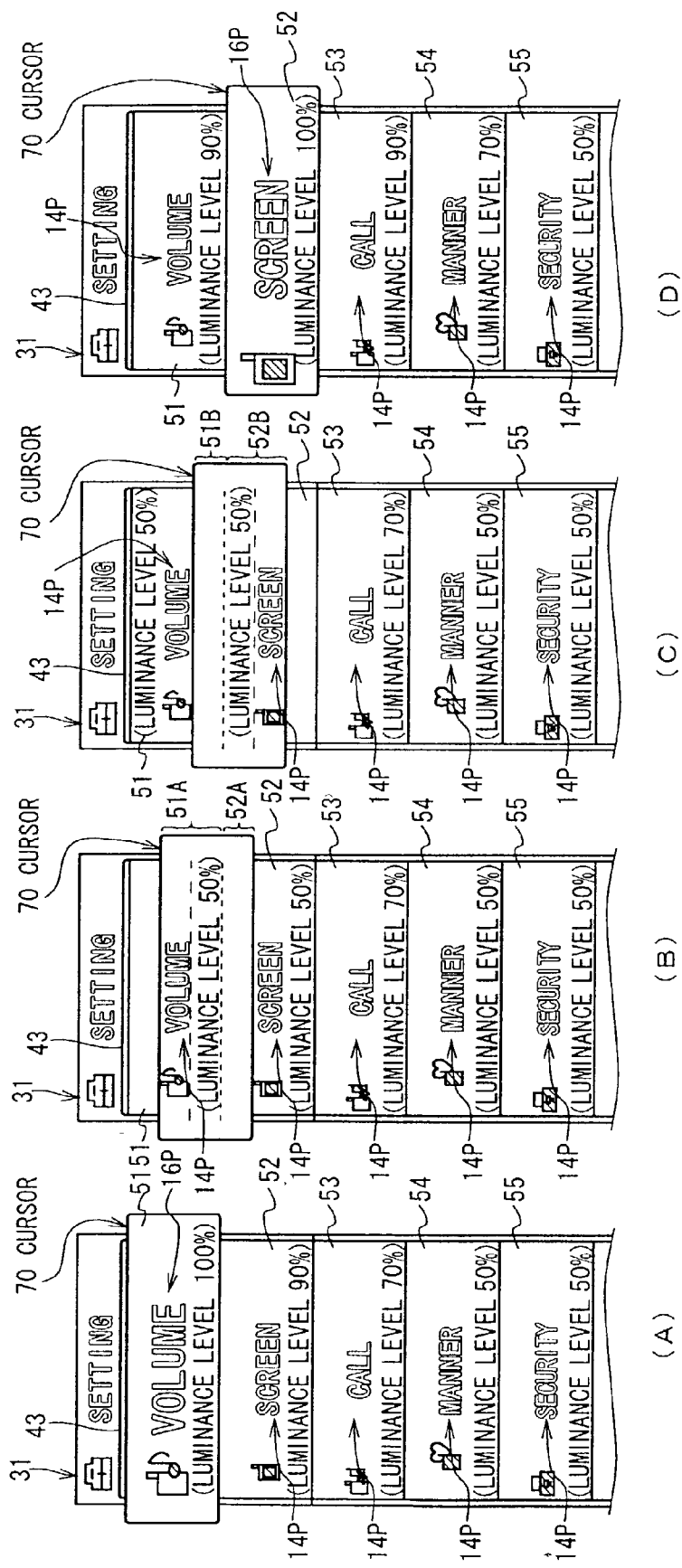
FIG. 15 is illustrations explaining the movement of the cursor.

In the case where "volume" item 51 is selected with the cursor 70 on the setting menu 31 as shown in FIG. 15(A), for example, the title letters of "volume" are displayed in 16 pint at a luminance level of 100% corresponding to the coordinate value L1 (Y1, CB1, CR1) in the spatial coordinate of the color solid as shown in FIG. 9, and also the title letters of next "screen" item 52 unselected are displayed in 14 point at a luminance level of 90% corresponding to the coordinate value L2 (Y2, CB2, CR2), and at step SP21 the CPU 20 moves the cursor 70 by 1/3 step in the rotation direction of the jog dial 13 as shown in FIG. 15(B) from that situation and moves to next step SP22.

In this connection, the CPU 20 displays the title letters of "screen" item 52 in 14 point so as to show them in the middle area obtained by dividing the area of the item 52 into three, and the other unselected items are displayed in the same way.

Moved by 1/3 step, the cursor 70 focuses on an area consisting of an area 51A which is the 2/3 area of "volume" item 51 and an area 52A which is the 1/3 area of the next "screen" item 52, and therefore at step SP22 the CPU 20 changes the title letters of "volume" item 51 from 16 point to 14 point and displays the title letters of "volume" item 51 at the luminance level (50%) and color tone corresponding to the coordinate value L4(Y4, CB4, CR4) in the spatial coordinate of the color solid.

Simultaneously, the CPU 20 displays the title letters of the next "screen" item 52 at a luminance level (50%) and color tone corresponding to the coordinate value L4(Y4, CB4, CR4) in the spatial coordinate of the color solid without changing their letter size of 14 point and then, moves to next step SP23.

The CPU 20 judges at step SP23 whether the cursor 70 has moved to focus on only the next "screen" item 52. When a negative result is obtained, which means that the cursor is not just on the next "screen" item 52 and in this case, the CPU 20 returns to step SP21 and repeats the above processing.

In this case, the CPU 20 moves the cursor 70 by another 1/3 step from the display situation of setting menu 31 shown in FIG. 15(B) and thus setting menu 31 is in a display situation shown in FIG. 15(C). "Volume" item 51 and "screen" item 52 shown in FIG. 15(C) are displayed at the same luminance level and color tone as those of setting menu 31 shown in FIG. 15(B).

On the other hand, when an affirmative result is obtained at step SP23, which means that the cursor 70 has been moved and now is positioned just on the next "screen" item 52 and in this case, the CPU 20 moves to next step SP24.

Since the cursor 70 has moved to be just on the next "screen" item 52 as shown in FIG. 15(D), the CPU 20 displays "screen" item 52 with changing its title letters to those in 16 point and at the luminance level of 100% corresponding to the coordinate value L1(Y1, CB1, CR1) in the spatial coordinate of the color solid at step SP24.

Simultaneously, the CPU 20 displays the currently unselected "volume" item 51 and "call" item 53, which are arranged above and next respectively, without changing its letter size of 14 point and with changing its title letters to those at the luminance level of 90% and color tone corresponding to the coordinate value L2(Y2, CB2, CR2), displays "manner" item 54 with changing its title letters to those at the luminance level of 70% and color tone corresponding to the coordinate value L3(Y3, CB3, CR3), displays "security" item 55 and the successive items with changing their title letters to those at the luminance level of 50% and color tone corresponding to the coordinate value L4(Y4, CB4, CR4), and then returns to step SP2 of routine RT1.

Figure 16:
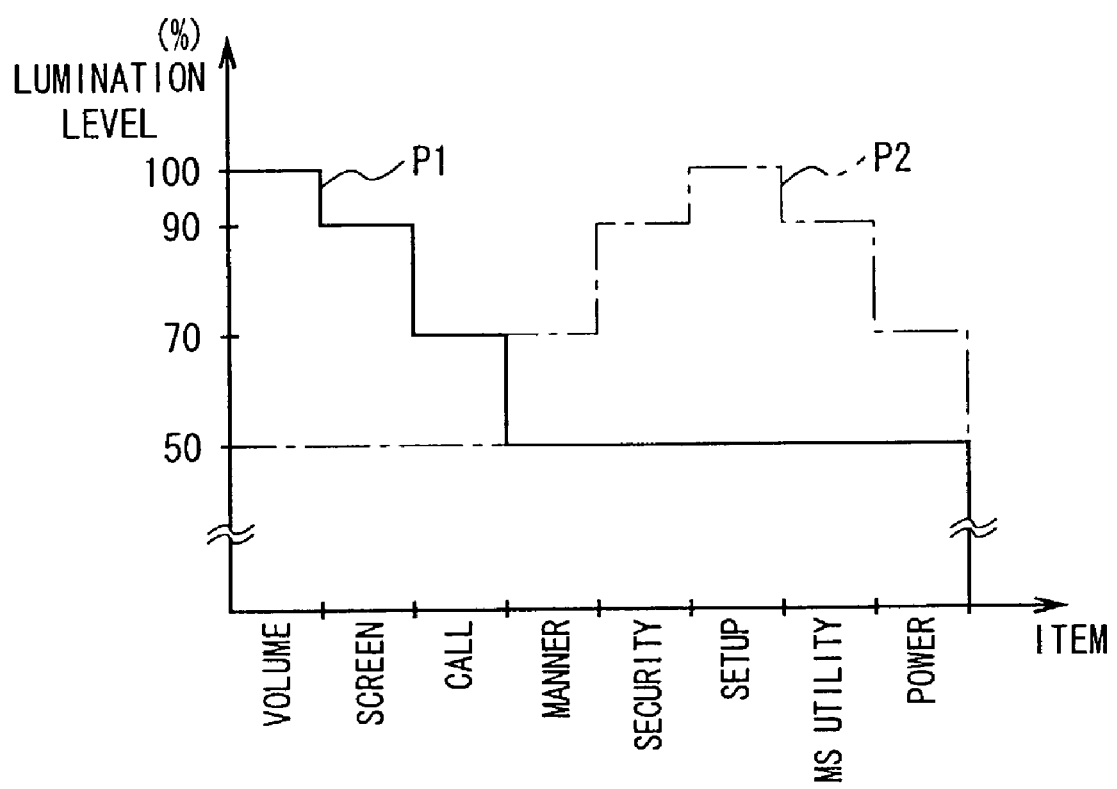
FIG. 16 is a schematic diagram showing variations in luminance levels.

That is, as shown in FIG. 16, the CPU 20 controls the display of the setting menu 31 so that the luminance levels of the title letters of "volume" item 41–"power" item 58 are based on a luminance level control pattern P1 shown by a solid line, and further in the case where "setup" item 56 is selected by moving the cursor 70, the CPU 20 controls the display based on a luminance level pattern P2 shown by a dotted line. Thereby, an selected item, which is selected with the cursor 70, is always displayed at the highest luminance level and the unselected items are displayed at the luminance levels which are decreased as they get farther from the selected item.

On the other hand, when an affirmative result is obtained at step SP7, which means that the rotation operation of the jog dial 13 causes the cursor to be positioned on an end item in the item display area 43 and in this case, the CPU 20 moves to next step SP8.

At step SP8, the CPU 20 judges whether undisplayed items (lower undisplayed items 61 or upper undisplayed items 63) exist in the movement direction of the cursor 70.

When a negative result is obtained at step SP8, which means that undisplayed items do not exist in the movement direction of the cursor 70 and in this case, the CPU 20 executes the cursor movement processing 1 of the aforementioned subroutine SRT2.

This situation is such a situation that, for example, the cursor 70 selects the second item ("mail" item 59, in this case) from the end in the item display area 43 as shown in FIG. 17(A) and the jog dial 13 is to be rotated in the end direction (in a downward direction, in this case).

Figure 17:
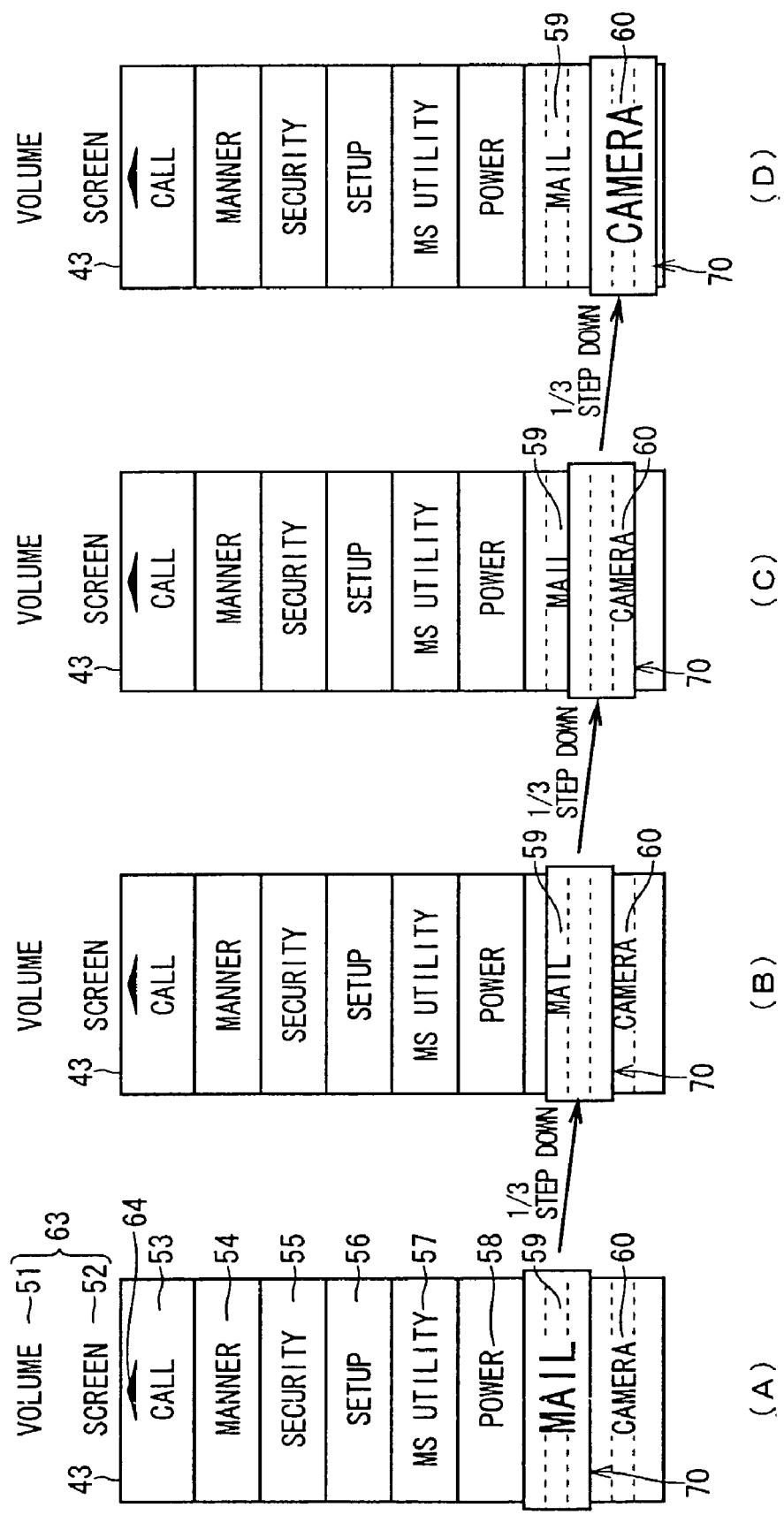
FIG. 17 is illustrations explaining the movement of the cursor.
Figure 18:
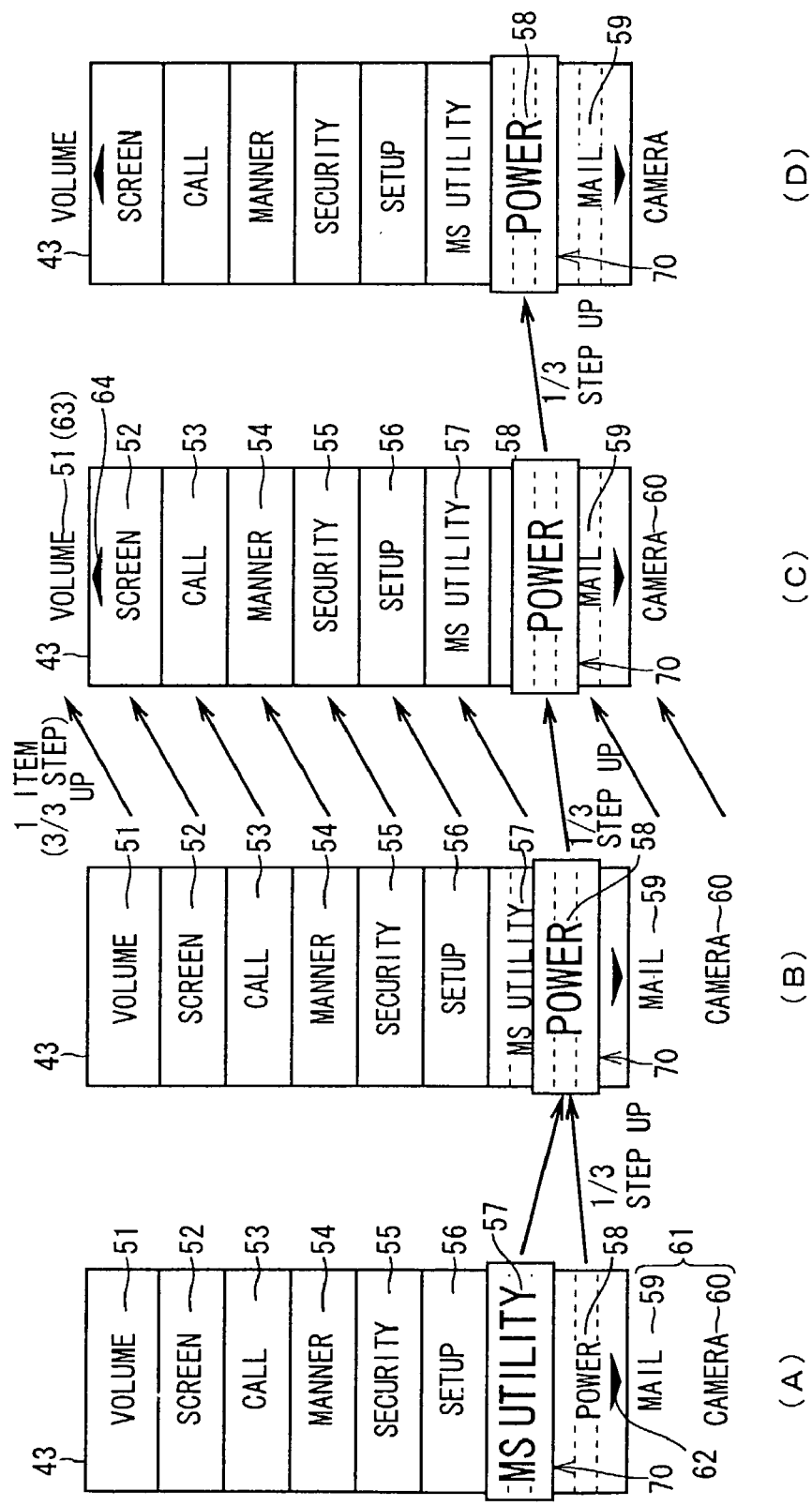
FIG. 18 is illustrations explaining the movement of the cursor.

Note that, FIG. 17, and FIG. 18 do not has icons which should be attached to items, but shows only the item display area 43, items 51–60, and cursor 70 to simply explain how the cursor 70 moves.

In this case, the CPU 20 moves the cursor 70 three times 1/3 step at a time in a downward direction as shown in FIG. 17(B)–FIG. 17(D), and as shown in FIG. 17(D), displays the cursor 70 on a bottom item ("camera" item 60, in this case) in the item display area 43.

On the other hand, when an affirmative result is obtained at step SP8, which means that undisplayed items exist in the movement direction of the cursor 70 and in this case, the CPU 20 executes the cursor movement processing 2 of the subroutine SRT3.

This situation is a situation shown in FIG. 18, that is, for example, the cursor,70 selects the second item ("MS utility" item 57, in this case) from the end in the item display area 43, undisplayed items (lower undisplayed items 61, in this case) exist on the end side and the jog dial 13 is to be rotated in the end direction.

Figure 19:
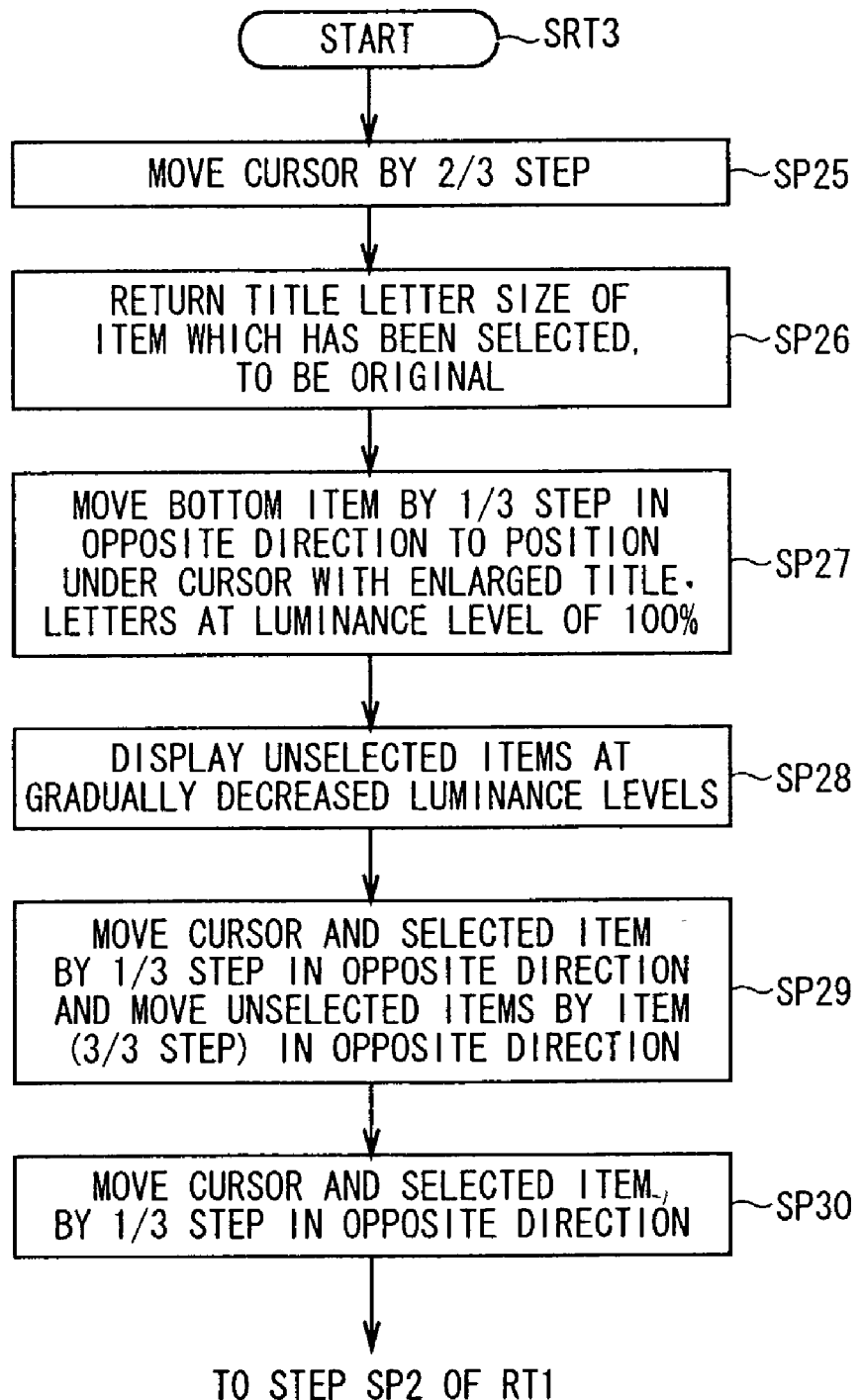
FIG. 19 is a flowchart showing a cursor movement processing procedure.

As shown in FIG. 19, the CPU 20 starts the subroutine SRT3 at start step and moves to next step SP25.

The CPU 20 moves and displays the cursor 70 by 2/3 step in the rotation direction of the jog dial 13 at step SP25 and moves to next step SP26.

The CPU 20 displays "MS utility" item 57, which has been selected, at the luminance level of 50% with changing the title letter size from 16 point to 14 point, and then moves to next step SP27.

At step SP27, the CPU 20 moves "power" item 58 which is to be selected next, by 1/3 step in an direction opposite to the rotation direction of the jog dial 13 so as to be under the cursor 70 and also displays this item at the luminance level of 100% with changing its title letter size from 14 point to 16 point, as shown in FIG. 18(B), and then moves to next step SP28.

At step SP28, the CPU 20 displays the title letters of the other unselected items at gradually decreased luminance levels, and moves to next step SP29.

At step SP29, the CPU 20 moves the cursor 70 and the selected "power" item 58 by 1/3 step in a direction opposite to the rotation direction of the jog dial 13 and also moves the other unselected items together by one item (3/3 step) in the opposite direction as shown in FIG. 18(C).

Thereby, "mail" item 59, which has been hidden below the item display area 43, is moved to the bottom in the item display area 43 and displayed. In addition, "volume" item 51, which has been displayed at the top end in the item display area 43, is moved above the item display area 43 as the upper undisplayed item 63 and as a result, an upward icon 64 which indicates that the upper undisplayed items 63 exist is displayed at the top in the item display area 43.

At following step SP30, the CPU 20 moves the cursor 70 and the selected "power" item 58, by further 1/3 step in a direction opposite to the rotation direction of the jog dial 13 to become to be a second item from the end in the item display area 43, and then returns to step SP2 of the routine RT1.

As described above, when the downward rotation is performed to move the cursor 70 to the bottom item in the item display area 43 while the lower undisplayed items 61 exist, the portable telephone 1 moves the cursor 70 downwards once to select the bottom item and then moves the cursor and all items upwards to display the item which is selectable next at the bottom in the item display area 43.

Simultaneously, when upward rotation is performed to move the cursor to the top item in the item display area 43 while the upper undisplayed items 63 exist, the portable telephone 1 moves the cursor 70 upwards once to select the top item and then moves the cursor 70 and all the items downwards to display the item which is selectable next, at the top in the item display area 43.

In the portable telephone 1 of this invention, since the direction of the rotation operation of the jog dial 13 is always the same as the movement direction of the cursor 70 as described above, the screen display matches the inputted operation directions, so that the user can recognize from the screen display that his rotation operation has been surely entered and also can be prevented from entering erroneous operations.

(4) Operations and Effects

As described above, the CPU 20 of the portable telephone 1 displays the various menus 31–35 in respective colors in accordance with the menu display control program 26, thereby allowing a user to immediately recognize the mode of the menu 31–35 arranged in front.

In addition, the CPU 20 displays a side of each of my select menu 32, tool menu 33, directory menu 34, and memory stick menu 35, which are displayed in respective colors, so as to see it from the sides of setting menu 31 arranged in front, thereby this colorful visual three-dimensional display allows the user to immediately recognize that the four kinds of menus 32–35 exist other than the currently selected setting menu 31 arranged in front.

In addition, the CPU 20 displays the volume setting screen 38 which is in a lower hierarchical layer of "volume" item 51, which has been selected and confirmed by rotating and pressing the jog dial 13 out of the setting menu 31 selected by pressing the left direction key 14 or right direction key 15, in red which is the same color as the setting menu 31, thereby the user, who is seeing the volume setting screen 38 in the lower hierarchical layer, always knows which mode he is operating now, thus the user does not need to return to the higher hierarchical layer to confirm the mode.

Furthermore, the CPU 20 displays the various menus 31–35 in dedicated colors, which allows the user to immediately recognize that his operations of the left direction key 14 and right direction key 15 have been surely entered because the color of a menu arranged in front changes when the various menus 31–35 are rotated in turn with the left direction key 14 and right direction key 15. Thus, the user can prevent erroneous operations which occur due to erroneously menu recognition.

Still further, the CPU 20 displays various items 51–60 which are selectable in the setting menu 31, for example, and shows existence of four kinds of menus 32–35 behind that menu, thereby allowing the user to immediately recognize how many selectable items exist other than the setting menu 31.

Then, after the CPU 20 displays the user-desired setting menu 31 in front in response to pressing the left direction key 14 or right direction key 15 by the user, a desired item can be immediately selected and confirmed by rotating and pressing the jog dial 13 only, and as a result, in the case where plural icons corresponding to an item are arranged in a matrix, this item selection is much more effective, as compared with the case the left direction key 14 and right direction key 15 should be pressed many times.

According to the above structure, when the CPU 20 displays the various menus 31–35 corresponding to a mode on the display 9, the various menus 31–35 are displayed in respective dedicated colors, thereby allowing the user to easily and immediately recognize the kind of menu from its color, thus making it possible to provide an improved graphical user interface which is much easier to use with high visual property.

Still further, in the aforementioned structure, the CPU 20 of the portable telephone 1 displays the selected item, which is being selected with the cursor 70 in the menu screen 30, at the highest luminance level while displaying the unselected item at luminance levels which are decreased one by one as they get farther from the selected item, in accordance with the menu display control program 26, thereby only selected item, which is selected by the cursor 70, can be brightly displayed, so that a selected item can be much easier to recognize for a user.

Still further, the CPU 20 displays the unselected items, which are not selected by the cursor 70, at luminance levels and color tones which are decreased and darkened one by one as they get father from the selected item, which makes the user focus on the selected item which is brightest and easiest to recognize.

Still further, the CPU 29 displays the unselected item next to the selected item, at the luminance level of 90%, thereby the user who is focusing on the selected item can immediately recognize that item without moving his eyes.

Still further, the CPU 20 displays the title letters of the selected item in a color which vividly contrasts with the area color of the cursor 70, and when the selected item is selected, it displays it in a bigger letter size, which offers improved visual property to users.

According to the above structure, the CPU 20 displays the selected item, which is selected by the cursor 70 in the menu screen, at the highest luminance level while displaying the unselected items at luminance levels which are gradually decreased as they get farther from the selected item, so that the unselected items are difficult to see but only selected item can be remarkable, thus making it possible to provide an improved graphical user interface which is easy to use and which allows a user to easily recognize the selected item.

Further, in the aforementioned structure, the CPU 20 of the portable telephone 1 selects a next item by moving the cursor 70 on the menu screen 30 in the same direction as the rotation operation direction of the jog dial 13, in accordance with the menu display control program 26.

In this connection, in the case where the cursor 70 moves to the end item in the item display area 43 and undisplayed items exist on the movement direction side of the cursor 70, the CPU 20 selects the end item by moving the cursor 70 in the same direction as the rotation direction, moves the cursor 70 and the all items in the opposite direction to the rotation operation direction, so that the cursor 70 is on the second item from the end item in the item display area 43 and a hidden undisplayed item is displayed at the end in the item display area 43.

Thus, in the portable telephone 1, the rotation direction of the jog dial 13 by the user is always the same as the movement direction of the cursor 70, so that the user can recognize from the movement of the cursor 70 that the rotation operation of the jog dial 13 has been surely entered, thus making it possible to prevent erroneous operations of the portable telephone 1.

In addition, in the portable telephone 1, the item which is selectable next can be always displayed in the item display area 43, so that the item selection can be easily performed.

Furthermore, in the portable telephone 1, a novel graphical interface can be displayed as if the cursor 70 takes out a hidden undisplayed item to display it in the item display area 43.

According to the above structure, in the case of moving the cursor 70 in the end direction in which undisplayed items exist, the CPU 20 firstly moves the cursor 70 in the same direction as the rotation operation direction to select the end item and then, moves the cursor 70 and all items in the opposite direction to the rotation operation direction, thereby the rotation direction of the jog dial 13 is always the same as the movement direction of the cursor 70 and also the item which is selectable next can be displayed in the item display area 43, thus making it possible to provide a graphical interface which is easy to use to perform item display with high operability.

(5) Other Embodiments

Note that, the aforementioned embodiment has described the case where the CPU 20 serving as a control means displays a volume setting screen 38 which is in a one-lower hierarchical layer of "volume" item 51 selected in the setting menu 31, in the same color as the setting menu 31. The present invention is not limited to this and if there is a lower hierarchical screen of the volume setting screen 38, this screen can be displayed in the same color. In short, a screen can be displayed in the same color as its higher hierarchical screen even if it is in much lower hierarchical layer. In this case also, the same results can be obtained as those of the aforementioned embodiment.

Further, the aforementioned embodiment has described the case of displaying the total five kinds of various menus 31–35 in a visually three-dimensional display manner. The present invention, however, is not limited to this and plural kinds of menus such as seven or nine kinds of menus can be displayed in the visually three-dimensional display manner, depending on the display area of the display unit 9.

Still further, the aforementioned embodiment has described the case where the CPU 20 controls luminance levels with the selected item, which is selected with the cursor 70, as a basis. The present invention is not limited to this and the CPU 20 can directly control the luminance level of the selected item which is selected in accordance with the rotation operation of the jog dial 13 without the cursor 70.

Still further, the aforementioned embodiment has described the case of displaying the title letters of the selected item in white which vividly contrasts with red which is the area color of the cursor 70. The present invention is not limited to this and the selected item can be displayed in another color which vividly contrasts with the area color of the cursor 70.

Figure 20:
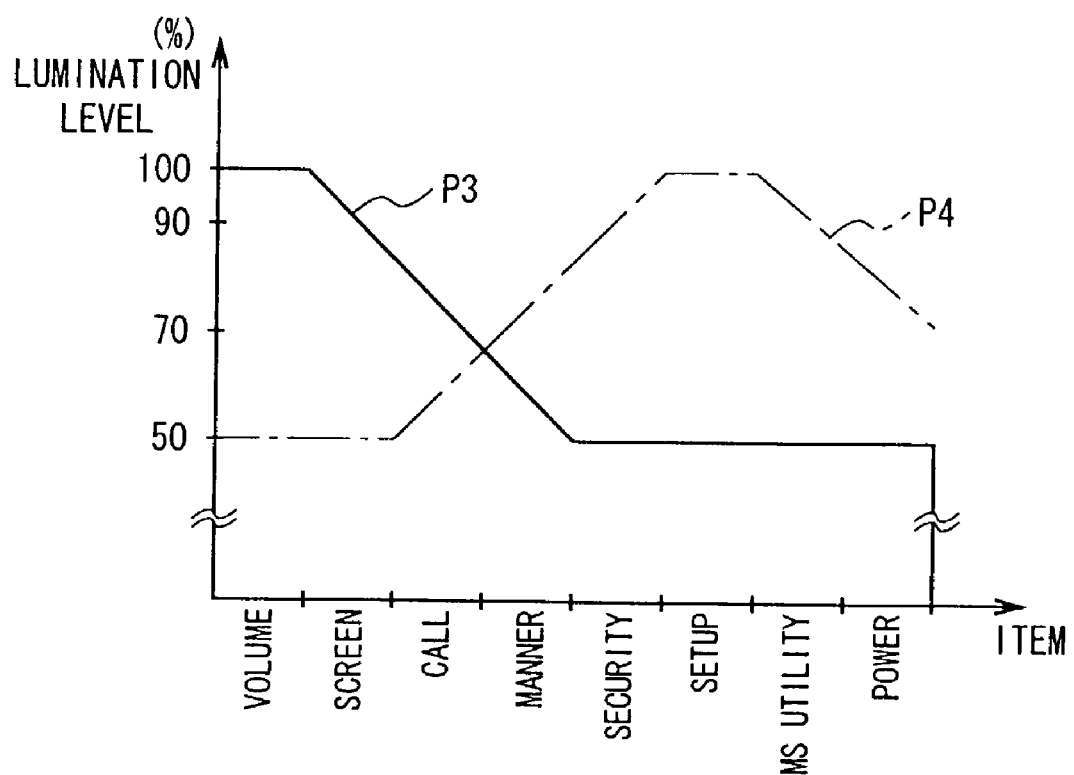
FIG. 20 is a schematic diagram showing variations in luminance levels in another embodiment.
Figure 21:
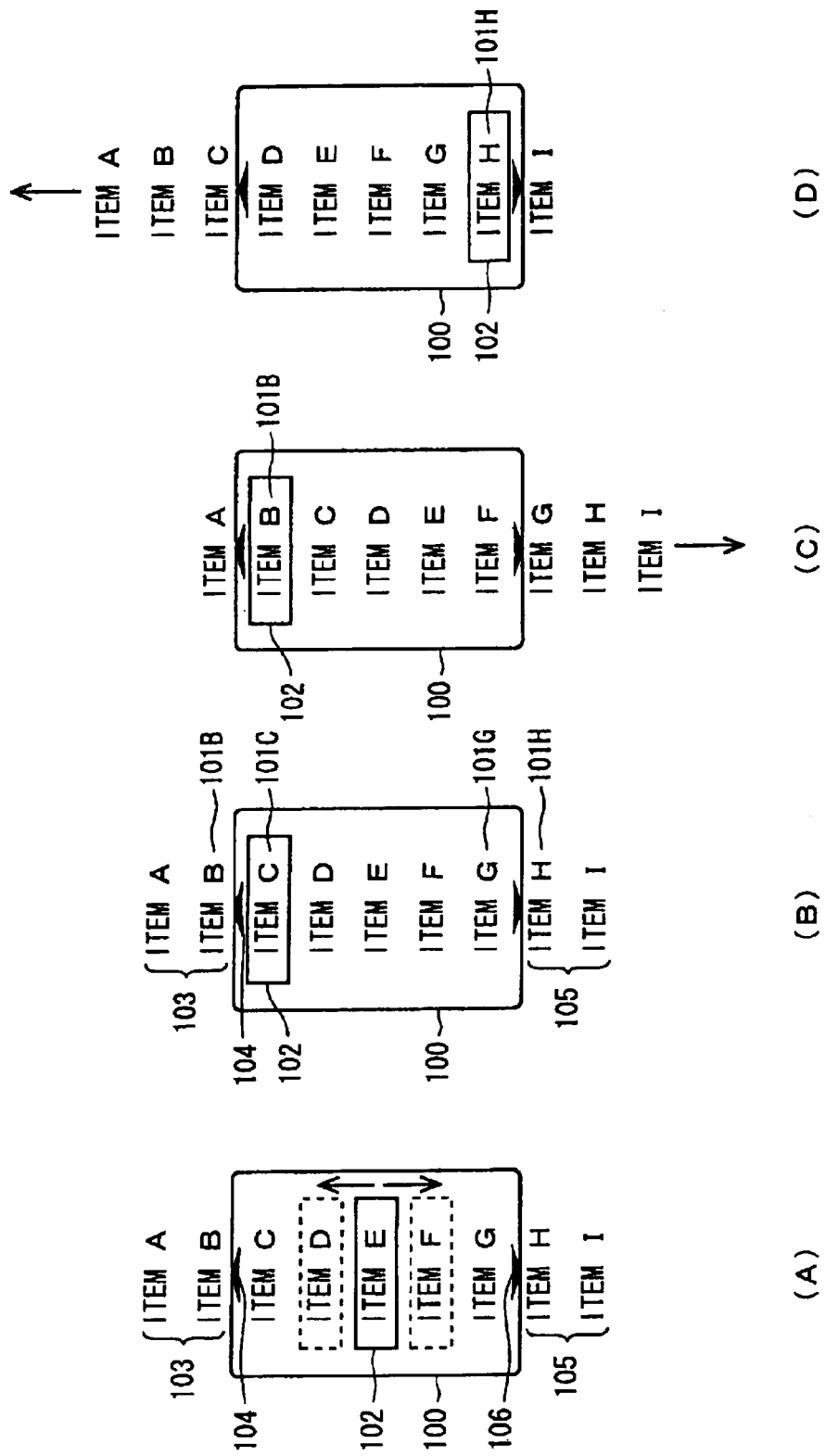
FIG. 21 is illustrations explaining the movement of the cursor.

Still further, the aforementioned embodiment has described the case of deciding the luminance level of each of the selected item and unselected items in the setting menu 31 based on the luminance level control pattern P1, P2 as shown in FIG. 16. The present invention is not limited to this and the luminance levels of the selected item and unselected items can be gradually decreased every line in each item, based on the luminance level control pattern P3, P4 as shown in FIG. 20. In this case, the CPU 20 can display the items of the setting menu 31 which have smoother gradations in color as the unselected items get farther from the selected item.

Still further, the aforementioned embodiment has described the case of moving the cursor 70 with the jog dial 13 serving as an operating means. The present invention is not limited to this and other various operating means such as the left direction key 14 and right direction key 15 can be used.

Still further, the aforementioned embodiment has described the case where the cursor 70 moves between items by three steps so that it can smoothly move. The present invention is not limited to this and it can move by another steps such as four steps or eight steps, between them.

Still further, the aforementioned embodiment has described the case of displaying various menus 31–35 in a visually three-dimensional display manner and rotating them in a circle. The present invention is not limited to this and the menus can be rotated in another type of rotation manner other than the circle manner.

Still further, in the aforementioned embodiment, when the cursor 70 is moved to the end item on a side where undisplayed items exist, the cursor 70 is moved by 2/3 step and the end item is moved by 1/3 step in the opposite direction in order to select the item. The present invention is not limited to this and that item can be selected by moving the cursor 70 by one item (3/3 step) at once or by moving the cursor 70 1/3 step by 1/3 step, without moving the item, and in short, the end item is selected by moving the cursor in the operation direction and then the cursor 70 and all items can be moved in the opposite direction to the operation direction.

Still further, the aforementioned embodiment has described the case where the cursor 70 moves upwards and downwards in the item display area 43 in accordance with the rotation operations of the jog dial 13, and only when the cursor 70 moves to an end item, the cursor 70 and all items moves in the opposite direction. The present invention, however, is not limited to this and the cursor 70 is at a prescribed basic position (for example, in the middle of the item display area 43) in the item display area 43, and the cursor 70 is moved once in response to the rotation operation of the jog dial 13, and then the cursor 70 and all items are moved in the opposite directions, in order to display the cursor 70 at the basic position again.

Still further, the aforementioned embodiment has described the case where the CPU 20 puts the item display control program 26 previously stored in the ROM 22, in the RAM 23 to perform the item selection processing in accordance with the menu display control program 26. The present invention is not limited to this and the item selection processing can be performed by inserting a program storage medium storing the menu display control program 26 in the portable telephone 1.

As a program storage medium which is used for installing the menu display control program 26 for performing the aforementioned item selection processing, in the portable telephone 1, not only package medium such as floppy disk, CD-ROM (Compact Disc Read Only Memory) and DVD (Digital Versataile Disc), but also a semiconductor memory and magnetic disk which can temporarily or permanently store the menu display control program 26 can be used. In addition, as a means for storing the menu display control program 26 in the program storage medium, a wired or radio communication medium such as a local area network, Internet, and digital satellite broadcasting can be used and also storage is performed via various communication interface such as a router and modem.

Still further, the aforementioned embodiment has described the case where the item selection processing of the present invention is applied to the portable telephone 1. The present invention, however, is not limited to this and can be applied to other various information processing devices such as personal computer, PDA (Personal Data Assistant).

INDUSTRIAL UTILIZATION

The information processing device, the item display method and program storage medium of this invention are applied to a portable telephone, for example.

The invention claimed is:

1. A method of three-dimensionally rotating a plurality of menus displayed in an ordered stack on a display unit of a portable telephone, comprising the steps of:
   displaying said plurality of menus three-dimensionally on said display unit according to said ordered stack by displaying a current menu in a front position and arranging a remainder of said plurality of menus behind said current menu by displaying portions of said remainder of said plurality of menus behind both sides of said current menu, wherein each of said plurality of menus is two-dimensional and single-sided;
   selecting a menu rotation direction on said portable telephone; and
   sequentially rotating said plurality of menus in said menu rotation direction in accordance with said ordered stack, wherein a next menu in said ordered stack is rotated to said front position and becomes said current menu.

2. The method according to claim 1, wherein said current menu is enlarged and displayed at a high luminance level; and
   wherein said remainder of said plurality of menus are displayed at incrementally decreasing luminance levels as a number of menus from said current menu increases in said ordered stack.

3. The method according to claim 1, further comprising the steps of:
   selecting a current item from a plurality of items displayed in said current menu; and
   enlarging and displaying said current item at a high luminance level, wherein a remainder of said plurality of items are displayed at incrementally decreasing luminance levels as a number of items from said current item increases in said current menu.

4. The method according to claim 3, further comprising a step of:
   displaying a lower hierarchical menu corresponding to said current item, wherein said lower hierarchical menu is displayed in a same color as said current menu.

5. The method according to claim 1, wherein each of said plurality of menus is assigned and displayed in a distinct color.

6. An information processing device for three-dimensionally rotating a plurality of menus displayed in an ordered stack on a display unit of a portable telephone, comprising:
   display means for displaying said plurality of menus three-dimensionally on said display unit according to said ordered stack, wherein each of said plurality of menus is two-dimensional and single-sided;
   arranging means for arranging a current menu in a front position and a remainder of said plurality of menus behind said current menu by displaying portions of said remainder of said plurality of menus behind both sides of said current menu;
   selection means for selecting a menu rotation direction on said portable telephone; and
   control means for sequentially rotating said plurality of menus in said menu rotation direction in accordance with said ordered stack, wherein a next menu in said ordered stack is rotated in said menu rotation direction to said front position and becomes said current menu.

7. The information processing device according to claim 6, wherein said current menu is enlarged and displayed at a high luminance level; and
   wherein said remainder of said plurality of menus are displayed at incrementally decreasing luminance levels as a number of menus from said current menu increases in said ordered stack.

8. The information processing device according to claim 6, wherein said selection means selects a current item from a plurality of items displayed in said current menu;
   wherein said display means enlarges and displays said current item at a high luminance level; and
   wherein a remainder of said plurality of items are displayed at incrementally decreasing luminance levels as a number of items from said current item increases in said current menu.

9. The information processing device according to claim 8, wherein said display means displays a lower hierarchical menu corresponding to said current item; and
   wherein said lower hierarchical menu is displayed in a same color as said current menu.

10. The information processing device according to claim 6, wherein each of said plurality of menus is assigned and displayed in a distinct color.

* * * * *